US008942126B2

(12) United States Patent
Taoka et al.

(10) Patent No.: US 8,942,126 B2
(45) Date of Patent: Jan. 27, 2015

(54) FEEDBACK INFORMATION TRANSMISSION METHOD, MOBILE STATION APPARATUS AND BASE STATION APPARATUS

(75) Inventors: Hidekazu Taoka, Tokyo (JP); Katsutoshi Kusume, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 165 days.

(21) Appl. No.: 13/642,172

(22) PCT Filed: Apr. 21, 2011

(86) PCT No.: PCT/JP2011/059782
§ 371 (c)(1),
(2), (4) Date: Nov. 20, 2012

(87) PCT Pub. No.: WO2011/132727
PCT Pub. Date: Oct. 27, 2011

(65) Prior Publication Data
US 2013/0094380 A1    Apr. 18, 2013

(30) Foreign Application Priority Data
Apr. 23, 2010    (JP) ................. 2010-100036

(51) Int. Cl.
*H04L 1/00*    (2006.01)
*H04B 7/04*    (2006.01)
(Continued)

(52) U.S. Cl.
CPC ............ *H04B 7/0478* (2013.01); *H04B 7/0417* (2013.01); *H04B 7/0632* (2013.01);
(Continued)

(58) Field of Classification Search
CPC .................................................. H04B 7/0478
USPC .......................................................... 370/252
See application file for complete search history.

(56) References Cited

U.S. PATENT DOCUMENTS

2009/0268833 A1*  10/2009  Ariyavisitakul et al. ...... 375/262
2011/0164696 A1*   7/2011  Choi et al. .................... 375/260
(Continued)

OTHER PUBLICATIONS

International Search Report w/translation issued in PCT/JP2011/059782 mailed May 24, 2011 (4 pages).
NTT DoCoMo; "Performance of DL MU-MIMO Based on Implicit Feedback Scheme in LTE-Advanced"; 3GPP TSG RAN WG1 Meeting #60, R1-101218; San Francisco, USA; Feb. 22-26, 2010 (8 pages).
Research in Motion; "Feedback Reduction in DL MU-MIMO using Pre-Assigned Companion Subsets"; 3GPP TSG RAN WG1 Meeting #60bis, R1-102051; Beijing, China; Apr. 12-16, 2010 (7 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).
Office Action for Japanese Application No. 2010-100036 dated Mar. 12, 2013, with English translation thereof (4 pages).

*Primary Examiner* — Huy D Vu
*Assistant Examiner* — Kevin Cunningham
(74) *Attorney, Agent, or Firm* — Osha Liang LLP

(57) ABSTRACT

The present invention reduces the increase of the amount of feedback information, and, regardless of whether the correlation between antennas is high or low, increases the data rate upon MIMO transmission. A feedback information transmission method to assume a Hermitian transpose of a precoding matrix corresponding to a PMI that is selected in accordance with the amount of channel variation as a channel matrix (effective channel: $h_{k,\mathit{eff}}^{H}$) and transmit feedback information to use in MIMO transmission to a base station apparatus, includes selecting a PMI and an RI in accordance with the amount of channel variation and measuring a CQI for single-user MIMO transmission, calculating complementary information (for example, CQI difference information $\Delta$CQI) to complement the difference between the CQI for single-user MIMO transmission and a CQI for multi-user MIMO transmission, and transmitting the PMI, RI, CQI for single-user MIMO transmission and complementary information to the base station apparatus as feedback information.

12 Claims, 9 Drawing Sheets

(51) Int. Cl.
*H04B 7/06* (2006.01)
*H04L 5/00* (2006.01)
*H04L 25/02* (2006.01)
*H04L 25/03* (2006.01)

(52) U.S. Cl.
CPC ............ *H04L1/0029* (2013.01); *H04L 5/0057* (2013.01); *H04L 25/0204* (2013.01); *H04L 25/0222* (2013.01); *H04L 25/0246* (2013.01); *H04L 25/03343* (2013.01); *H04B 7/0452* (2013.01); *H04L 5/0023* (2013.01); *H04L 5/0051* (2013.01); *H04L 5/006* (2013.01); *H04L 2025/03414* (2013.01); *H04L 2025/03426* (2013.01); *H04L 2025/03808* (2013.01)
USPC .......................................... 370/252; 375/224

(56) References Cited

U.S. PATENT DOCUMENTS

| | | | |
|---|---|---|---|
| 2011/0176629 A1* | 7/2011 | Bayesteh et al. | 375/267 |
| 2011/0194504 A1* | 8/2011 | Gorokhov et al. | 370/329 |
| 2011/0200081 A1* | 8/2011 | Guo et al. | 375/224 |
| 2013/0336416 A1* | 12/2013 | Sivanesan et al. | 375/267 |

* cited by examiner

FEEDBACK INFORMATION TRANSMISSION METHOD, MOBILE STATION APPARATUS AND BASE STATION APPARATUS

TECHNICAL FIELD

The present invention relates to a feedback information transmission method, a mobile station apparatus and a base station apparatus. More particularly, the present invention relates to a feedback information transmission method, a mobile station apparatus and a base station apparatus to support multi-antenna transmission.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study.

In a third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A)). For example, regarding LTE-A, there is a plan to expand the 20-MHz maximum system band of LTE specification to approximately 100 MHz.

Also, in a system of the LTE scheme, a MIMO (Multi Input Multi Output) system is proposed (see, for example, non-patent literature 1), as a radio communication technique to transmit and receive data by a plurality of antennas and improve the data rate (spectral efficiency). In the MIMO system, a plurality of transmitting/receiving antennas are provided in the transmitter/receiver, so that different transmission information sequences are transmitted from different transmitting antennas, at the same time. On the other hand, the receiver, by taking advantage of the fact that fading variation is produced between transmitting/receiving antennas, and by separating and detecting the information sequences that have been transmitted from the transmitter at the same time, it is possible to increase the data rate.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

In the system of the LTE scheme, single-user MIMO (SU-MIMO) to transmit transmission information sequences to one user from varying transmitting antennas at the same time, and multiple-user MIMO (MU-MIMO) to transmit transmission information sequences to different users from a plurality of transmitting antennas at the same time, are defined. In these SU-MIMO transmission and MU-MIMO transmission, the receiver measures the amount of channel variation using the received signals from each antenna, and, based on the amount of channel variation that is measured, selects a PMI (Precoding Matrix Indicator) and an RI (Rank Indicator). In this case, the receiver selects a PMI and an RI that correspond to the amount of phase/amplitude control (precoding weight) at which the throughput (or reception SINR) after transmission data from each transmitting antenna of the transmitter is combined becomes the maximum. Then, the selected PMI and RI are fed back to the transmitter with a CQI (Channel Quality Indicator), which refers, to channel quality information. The transmitter transmits a transmission information sequence, by performing precoding for each transmitting antenna based on the PMI, RI and CQI that are fed back.

Generally, to increase the data rate in the MIMO system, it is necessary to adequately select the MIMO transmission scheme (SU-MIMO transmission or MU-MIMO transmission) and select an adequate precoding weight that maximizes the throughput of transmission data, based on feedback information from the receiver. To select an adequate precoding weight in the selected MIMO transmission scheme, the CQI to be fed back from the receiver plays an important role. However, due to the influence of the correlation between antennas, there is a possibility that the actual channel quality is not reflected in the CQI to be fed back. In this case, it is not possible to select a precoding weight that corresponds to the actual channel quality, and, as a result, it is difficult to improve the data rate.

Also, to report the actual channel quality to the transmitter, it may be possible to feed back a plurality of pieces of feedback information including a CQI, including one calculated presuming SU-MIMO transmission and one calculated presuming MU-MIMO transmission. However, in this case, the amount of information with feedback information increases, and the overhead of feedback information in comparison to the transmission data becomes a problem.

The present invention has been made in view of the above backgrounds, and it is therefore an object of the present invention to provide a feedback information transmission method, a mobile station apparatus and a base station apparatus that can reduce the increase of the amount of feedback information and that also can increase the data rate upon MIMO transmission regardless of whether the correlation between antennas is high or low.

Solution to Problem

A feedback information transmission method of the present invention assumes a Hermitian transpose of a precoding matrix corresponding to a PMI that is selected in accordance with an amount of channel variation as a channel matrix and transmits feedback information to use in MIMO transmission to a base station apparatus, and this feedback information transmission method includes the steps of: selecting the PMI and an RI in accordance with the amount of channel variation; measuring a CQI for single-user MIMO transmission in accordance with the amount of channel variation; calculating complementary information that complements a difference between the CQI for single-user MIMO transmission and a CQI for multi-user MIMO transmission; and transmitting the PMI, RI, CQI for single-user MIMO transmission and complementary information to the base station apparatus as the feedback information.

According to this method, complementary information to complement the difference between the CQI for single-user MIMO transmission and the CQI for multi-user MIMO transmission are included in the feedback information and transmitted to the base station apparatus, so that the base station apparatus can determine the CQI for multi-user MIMO transmission from the CQI for single-user MIMO transmission and complementary information included in the feedback information, and select a precoding weight based on the CQI for multi-user MIMO transmission. By this means, even when the correlation between antennas is low and the CQI for single-user MIMO transmission included in the feedback information and the actual channel quality do not match each other, it is still possible to perform precoding by an adequate precoding weight that matches the actual channel quality. Also, since the complementary information is smaller than the CQI for single-user MIMO transmission, compared to the case where feedback information for multi-user MIMO transmission is added and fed back, it is possible to prevent the amount of feedback information from increasing significantly. As a result of this, it is possible to reduce the increase of the amount of feedback information and also increase the data rate upon MIMO transmission regardless of whether the correlation between antennas is high or low.

A mobile station apparatus of the present invention assumes a Hermitian transpose of a precoding matrix corresponding to a PMI that is selected in accordance with an amount of channel variation as a channel matrix and transmits feedback information to use in MIMO transmission to a base station apparatus, and this mobile station apparatus includes: a selection section configured to select the PMI and an RI in accordance with the amount of channel variation; a measurement section configured to measure a CQI for single-user MIMO transmission in accordance with the amount of channel variation; a calculation section configured to calculate complementary information that complements a difference between the CQI for single-user MIMO transmission and a CQI for multi-user MIMO transmission; and a transmission section configured to transmit the PMI, RI, CQI for single-user MIMO transmission and complementary information to the base station apparatus as the feedback information.

According to this configuration, the PMI, RI, CQI for single-user MIMO transmission and complementary information are transmitted to the base station apparatus as feedback information, so that the base station apparatus can determine the CQI for multi-user MIMO transmission from the CQI for single-user MIMO transmission and complementary information included in the feedback information, and select a precoding weight based on the CQI for multi-user MIMO transmission. By this means, even when the correlation between antennas is low and the CQI for single-user MIMO transmission included in the feedback information and the actual channel quality do not match each other, it is still possible to perform precoding by an adequate precoding weight that matches the actual channel quality. Also, since the complementary information is smaller than the CQI for single-user MIMO transmission, compared to the case where feedback information for multi-user MIMO transmission is added and fed back, it is possible to prevent the amount of feedback information from increasing significantly. As a result of this, it is possible to reduce the increase of the amount of feedback information and also increase the data rate upon MIMO transmission regardless of whether the correlation between antennas is high or low.

A base station apparatus of the present invention assumes a Hermitian transpose of a precoding matrix corresponding to a PMI that is selected in accordance with an amount of channel variation as a channel matrix and receives feedback information to use in MIMO transmission from a mobile station apparatus, and this base station apparatus includes: a receiving section configured to receive the feedback information from the mobile station apparatus; a calculation section configured to calculate a CQI for multi-user MIMO transmission from a CQI for single-user MIMO transmission included in the feedback information and complementary information that complements a difference between the CQI for single-user MIMO transmission and the CQI for multi-user MIMO transmission; and a weight generation section configured to generate a precoding weight based on the CQI for multi-user MIMO transmission.

According to this configuration, a precoding weight is selected based on the CQI for multi-user MIMO transmission calculated based on the CQI for single-user transmission and complementary information included in the feedback information from the mobile station apparatus upon multi-user MIMO transmission, so that, even when the correlation between antennas is low and the CQI for single-user MIMO transmission included in the feedback information and the actual channel quality do not match each other, it is possible to perform precoding by an adequate precoding weight that matches the actual channel quality. Also, since the complementary information is smaller than the CQI for single-user MIMO transmission, compared to the case where feedback information for multi-user MIMO transmission is added and fed back, it is possible to prevent the amount of feedback information from increasing significantly. As a result of this, it is possible to reduce the increase of the amount of feedback information and also increase the data rate upon MIMO transmission regardless of whether the correlation between antennas is high or low.

Technical Advantage of the Invention

According to the present invention, it is possible to reduce the increase of the amount of feedback information and increase the data rate upon MIMO transmission regardless of whether the correlation between antennas is high or low.

DESCRIPTION OF EMBODIMENTS

Figure 1:
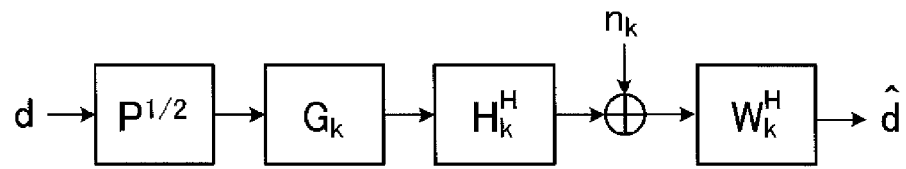
FIG. 1 is a conceptual diagram for explaining signal processing for transmission data in an SU-MIMO system.
Figure 2:
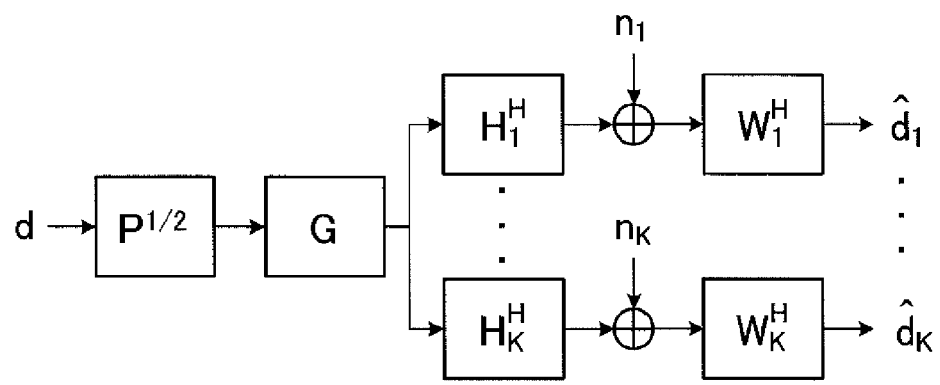
FIG. 2 is a conceptual diagram for explaining signal processing for transmission data in an MU-MIMO system.

First, before explaining the MIMO system to which the feedback information transmission method according to the present invention is applied, signal processing for transmission data (transmission information sequence) in a general MIMO system will be described. FIG. 1 is a conceptual diagram for explaining signal processing for transmission data in an SU-MIMO system, and FIG. 2 is a conceptual diagram for explaining signal processing for transmission data in an MU-MIMO system.

Note that, in the following descriptions, "k" represents the identification number (UE ID) of a mobile station apparatus UE, and "$P^{1/2}$" represents a transmission power control matrix. Also, "G" represents a precoding matrix for a mobile station apparatus UE, and "$G_k$" represents the precoding matrix for a k-th mobile station apparatus UE. Also, "$H_k^H$" is the channel matrix in the k-th mobile station apparatus UE, and "$W_k^H$" is the receiving filter (weight) matrix for the k-th mobile station apparatus UE. Furthermore, "$n_k$" is noise that is added to the k-th mobile station apparatus UE on the propagation path.

As shown in FIG. 1, in the SU-MIMO system, given transmission data d, which is distributed according to the number of transmission layers commanded from a higher station apparatus, the transmission power is controlled by the transmission power control matrix $P^{1/2}$ in the base station apparatus eNode B, and, after that, the amount of the phase/amplitude is controlled (shifted) by the precoding matrix $G_k$. Note that this precoding matrix $G_k$ is selected based on feedback information that is fed back from the mobile station apparatus UE.

The transmission data d having been subjected to phase/amplitude shifting is converted into a radio frequency band, and, after that, transmitted from a plurality of transmitting antennas onto a MIMO channel, which is a propagation path, as a transmission signal. Then, the transmission data on the MIMO channel is represented using the channel matrix $H_k^H$. The transmission signal to which noise nk is added on the MIMO channel is received by a plurality of receiving antennas of the mobile station apparatus UE. After that, a filtering processing section (here, a MMSE (Minimum Mean Square Error) filter) applies a filtering process by the receiving filter matrix $W_k^H$ to the received signal. By this means, estimated data of the original transmission data d is acquired in the mobile station apparatus UE.

Meanwhile, in the MU-MIMO system, also, given transmission data d, which is distributed according to the number of transmission layers commanded from a higher station apparatus, the transmission power is controlled by the transmission power control matrix $P^{1/2}$ in the base station apparatus eNode B, and, after that, the amount of the phase/amplitude is controlled (shifted) by the precoding matrix G. Note that, in the same way as in the SU-MIMO system, this precoding matrix G is selected based on feedback information that is fed back from the mobile station apparatus UE.

The transmission data d having been subjected to phase/amplitude shifting is converted into a radio frequency band, and, after that, transmitted from a plurality of transmitting antennas onto a MIMO channel, which is a propagation path, as transmission signals. Then, the transmission data on the MIMO channel is represented using channel matrices $H_1^H$ to $H_k^H$. The transmission signals to which noise $n_1$ to $n_k$ are added on the MIMO channel are received at the receiving antennas of a plurality of mobile station apparatuses UEs. After that, a filtering processing section (here, an MMSE (Minimum Mean Square Error) filter) applies a filtering process by receiving filter matrices $W_1^H$ to $W_k^H$, to the received signals. By this means, estimated data of the original transmission data $d_1$ to $d_k$ is acquired in a plurality of mobile station apparatuses UEs.

The major processes performed in mobile station apparatuses UEs in the SU-MIMO system and the MU-MIMO system include, as processes for calculating feedback information, a process of quantizing the amount of channel variation on the propagation path (hereinafter referred to as "quantization process") and a process of calculating a CQI (hereinafter referred to as "CQI calculation process"). Note that, in the quantization process in MIMO systems (SU-MIMO system and MU-MIMO system) of the LTE scheme, a precoding matrix (precoding weight) and a rank are selected.

Figure 3:
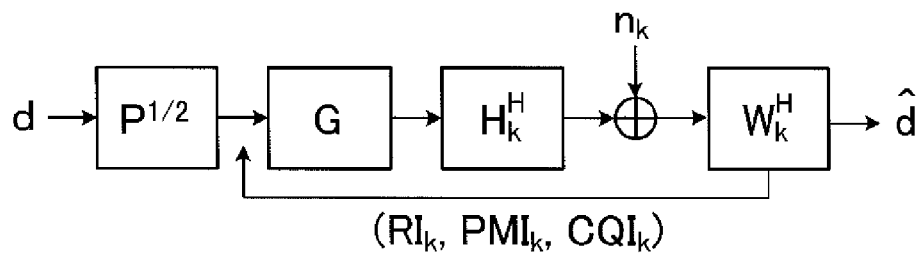
FIG. 3 is a diagram for explaining information that is fed back to a base station apparatus as a result of a quantization process and a CQI calculation process in an SU-MIMO system of an LTE scheme.
Figure 4:
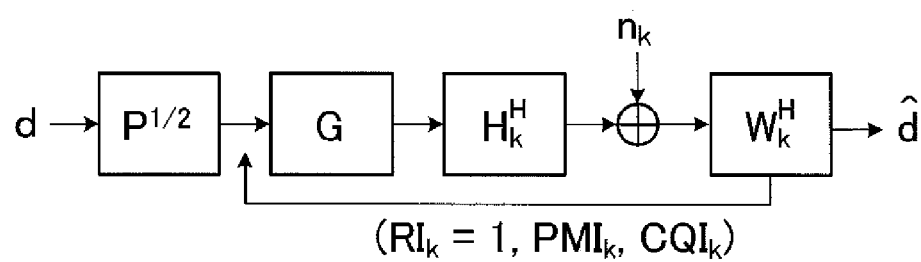
FIG. 4 is a diagram for explaining information that is fed back to a base station apparatus as a result of a quantization process and a CQI calculation process in a MU-MIMO system of the LTE scheme.

Below, the details of the quantization process and CQI calculation process in an SU-MIMO system and an MU-MIMO system to support the LTE scheme will be described. FIG. 3 and FIG. 4 are each a diagram for explaining information that is fed back to a base station apparatus eNode B as a result of the quantization process and CQI calculation process in the SU-MIMO system and MU-MIMO system of the LTE scheme. Note that, for ease of explanation, a single mobile station apparatus UE is shown in the MU-MIMO system shown in FIG. 4.

In the SU-MIMO system of the LTE scheme shown in FIG. 3, for quantization of the precoding weight, a precoding codebook (hereinafter referred to as "codebook") is used, which defines N precoding matrices in advance, per layer (stream) to match the number of receiving antennas. A common codebook is provided in both the mobile station apparatus UE and the base station apparatus eNode B. In the k-th mobile station apparatus UE in the SU-MIMO system of the LTE scheme, an optimal number of streams (rank) is selected, and also an optimal precoding matrix is selected for each. An optimal number of streams is selected as $RI_k$ (Rank Indicator), and a precoding matrix is selected as $PMI_k$. Then, the CQI of each stream is calculated, and this is fed back to the base station apparatus eNode B with $RI_k$ and $PMI_k$ selected. Meanwhile, in the base station apparatus eNode B, the user to maximize the data rate is selected based on the feedback information.

In the quantization process in a mobile station apparatus UE in the SU-MIMO system of the LTE scheme shown in FIG. 3, a combination of an RI and a PMI to maximize the data rate is calculated by equation 1:

$$\{RI_k, PMI_k\} = \underset{1 \le L \le N_R, 1 \le n \le N}{\operatorname{argmax}} \sum_{l=1}^{L} \log(1 + SINR_{L,n,l}) \quad \text{(Equation 1)}$$

Here, "$RI_k$" is an optimal rank for the k-th mobile station apparatus UE, and "$PMI_k$" is an optimal PMI for the k-th mobile station apparatus UE. Also, "L" is the rank, and "$N_R$" is the number of receiving antennas. Furthermore, "n" is the codebook index, and "N" is the codebook size. Furthermore, "l" is the transmission stream index (l=1, . . . , L).

In the CQI calculation process performed in the mobile station apparatus UE, for the combination of $RI_k$ and $PMI_k$ determined by equation 1, each stream's CQI value ($CQI_k$) is calculated by equation 2. Note that, in the SU-MIMO system of the LTE scheme, the number of CQIs is determined to be maximum two.

$$[CQI_k] = [SINR_{RI_k, PMI_k, 1}, SINR_{RI_k, PMI_k, 2}] \quad \text{(Equation 2)}$$

In the SU-MIMO system of the LTE scheme, $RI_k$, $PMI_k$ and $CQI_k$ calculated in this way are fed back to the base station apparatus eNode B as feedback information (see FIG. 3).

On the other hand, the MU-MIMO system of the LTE scheme is equivalent to a simplified, enhanced system of an SU-MIMO system, where a limitation of assigning one stream to one mobile station apparatus UE is applied. Consequently, except for the limitation of assigning one stream to one mobile station apparatus UE, common signal processing with an SU-MIMO system is performed.

For the quantization of the precoding weight, a codebook that defines N precoding matrices in advance, per stream, to match the number of receiving antennas, is used. In a mobile station apparatus UE in the MU-MIMO system of the LTE scheme, an optimal precoding matrix for one stream ($RI_k$=1) is selected, and the CQI of this stream is calculated and fed back to the base station apparatus eNode B with $RI_k$ and $PMI_k$ selected. Meanwhile, in the base station apparatus eNode B, two users that can achieve the maximum data rate are selected based on the feedback information. When two users are scheduled in this way, the CQIs included in the feedback information are adjusted. This is because $CQI_k$s from a plurality of (two) mobile station apparatuses UEs do not take into account the presence of other mobile station apparatuses UEs, and therefore it becomes necessary to estimate multiple access interference (hereinafter referred to as "MAI") based on these in the base station apparatus eNode B.

In the quantization process in a mobile station apparatus UE in the MU-MIMO system of the LTE scheme shown in FIG. 4, $SNR_n$ is calculated by equation 3:

$$SNR_n = P_{Tx} \| H_k^H g_n \|^2 \quad \text{(Equation 3)}$$

Here, "$g_n$" is defined as in equation 4:

$$g_n = G_{1,n} \quad \text{(Equation 4)}$$

That is to say, $g_n$ is defined as $G_{1,n}$, which represents the precoding matrix of the n-th codebook index of rank 1.

Then, based on the above $SNR_n$, $PMI_k$ is calculated by equation 5:

$$PMI_k = \underset{1 \le n \le N}{\operatorname{argmax}} \log(1 + SNR_n) \quad \text{(Equation 5)}$$

In the CQI calculation process in the k-th mobile station apparatus UE, each stream's CQI value ($CQI_k$) is calculated based on the $PMI_k$ determined by equation 5, by equation 6:

$$CQI_k = SNR_{PMI_k} \quad \text{(Equation 6)}$$

In the MU-MIMO system of the LTE scheme, $RI_k$ ($RI_k$=1), $PMI_k$ and $CQI_k$ calculated in this way are fed back to the base station apparatus eNode B as feedback information (see FIG. 4).

Now, in a system of the LTE-A scheme, a zero-forcing MU-MIMO (ZFMU-MIMO) system is under study, in which, to secure the freedom of precoding for each transmitting antenna of the transmitter, the Hermitian transpose of the precoding matrix corresponding to a PMI selected in a mobile station apparatus UE is assumed to be a channel matrix, and this channel matrix is fed back from the receiver as a CDI (Channel Direction Indicator), and the transmitter performs precoding for each transmitting antenna based on this CDI and transmits a transmission information sequence.

Figure 5:
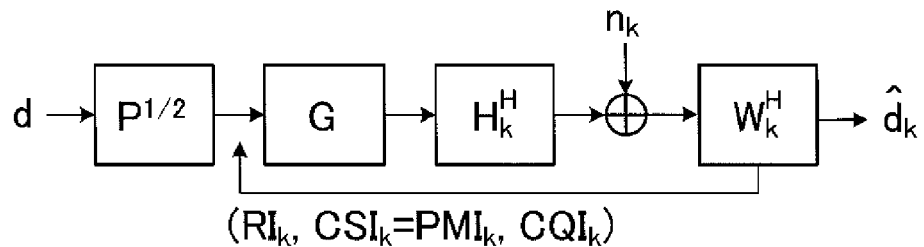
FIG. 5 is a processing conceptual diagram for explaining information that is fed back to a base station apparatus as a result of a quantization process and a CQI calculation process in a ZFMU-MIMO system of an LTE-A scheme.

FIG. 5 is a processing conceptual diagram for explaining information that is fed back to a base station apparatus as a result of the quantization process and the CQI calculation process in the ZFMU-MIMO system of the LTE-A scheme. Note that, for ease of explanation, in the ZFMU-MIMO system shown in FIG. 5, only a single mobile station apparatus UE is shown.

As shown in FIG. 5, the ZFMU-MIMO system of the LTE-A scheme is different from the MU-MIMO system of the LTE scheme in that a $PMI_k$ selected in a mobile station apparatus UE is fed back to the base station apparatus eNode B as $CSI_k$. Here, "$CSI_k$" represents the channel state information (CSI) of the k-th mobile station apparatus UE. The rest of the feedback information is common with the MU-MIMO system of the LTE scheme ($RI_k$ and $CQI_k$). Note that the ZFMU-MIMO system of the LTE-A scheme is different from the MU-MIMO system of the LTE scheme in that $RI_k$ can be selected from $RI_k$=1 and 2.

Figure 6:
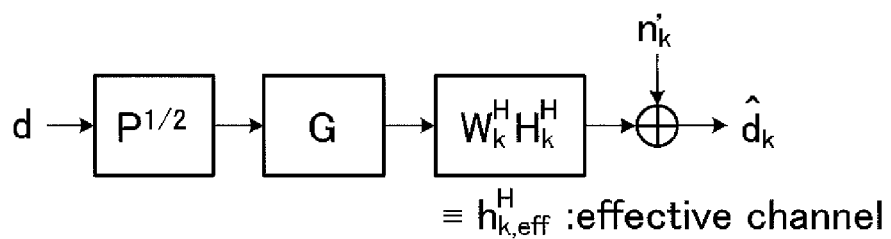
FIG. 6 shows a processing conceptual diagram that is equivalent to the ZFMU-MIMO system processing conceptual diagram shown in FIG. 5.

FIG. 6 shows a processing conceptual diagram that is equivalent to the ZFMU-MIMO system processing conceptual diagram shown in FIG. 5. Here, "$W_k^H H_k^H$" shown in FIG. 6 represents a matrix that is equivalent to the Hermitian transpose of a precoding matrix corresponding to a PMI selected in a mobile station apparatus UE, and is defined as an effective channel: $h_{k,eff}^H$.

In the quantization process in the mobile station apparatus UE of the ZFMU-MIMO system of the LTE-A scheme, $PMI_k$ to maximize the data rate is calculated by equation 7. Also, in the ZFMU-MIMO system shown in FIG. 6, the original transmission data $d_k$ acquired in the mobile station apparatus UE is calculated by equation 8. That is to say, in the ZFMU-MIMO system, as shown in equation 9, the Hermitian transpose of the precoding matrix corresponding to $PMI_k$ calculated by equation 7 is regarded as being equivalent to a channel matrix (effective channel $h_{k,eff}^H$).

$$PMI_k = \underset{1 \le n \le N}{\operatorname{argmax}} SNR_n \quad \text{(Equation 7)}$$

-continued $$\hat{d}_k = P_{Tx}^{1/2} w_k^H H_k^H g_k d_k + w_k^H n_k \quad \text{(Equation 8)}$$
$$= P_{Tx}^{1/2} h_{k,eff}^H g_k d_k + w_k^H n_k$$

$$h_{k,eff}^H \approx (g_{PMI_k})^H \quad \text{(Equation 9)}$$

In the CQI calculation process in the k-th mobile station apparatus UE, each stream's CQI value ($CQI_k$) is calculated based on $PMI_k$ determined by equation 7, by equation 10:

$$CQI_k = SNR_{PMI_k} \quad \text{(Equation 10)}$$

Note that, as in the MU-MIMO system of the LTE scheme, the $CQI_k$ that is calculated by equation 10 does not take into account the presence of other mobile station apparatuses UEs, and MAI based on these is not estimated. Consequently, in the base station apparatus eNode B, the CQI values are adjusted according to the number of users.

In this ZFMU-MIMO system, from eight transmitting antennas planned in LTE-A, transmission information sequences for different users can be transmitted, so that it is possible to increase the data rate significantly when the correlation between the antennas is high. Also, since the feedback information for the base station apparatus eNode B employs a format that is common with the MIMO system of the LTE scheme, it is possible to secure compatibility with the MIMO system of the LTE scheme.

However, since, in the ZFMU-MIMO system, the Hermitian transpose of the precoding matrix corresponding to $PMI_k$ selected in the mobile station apparatus UE is assumed to be a channel matrix (effective channel $h_{k,eff}^H$), in the quantization process in the mobile station apparatus. UE, quantization error might occur, depending on the correlation between antennas. In particular, quantization error such as this is more obvious when the correlation between antennas is low and increases as the correlation between antennas becomes lower. Then, the bigger this quantization error, the bigger MAI. However, MAI is not estimated with respect to $CQI_k$ that is calculated by equation 10. Consequently, compared to a CQI used in SU-MIMO transmission, the accuracy of a CQI that is used in MU-MIMO transmission is deteriorated.

To cope with this deterioration of the accuracy of the CQI, for example, it is possible to make feedback information in the MIMO system of the LTE scheme (hereinafter referred to as "LTE feedback information") be feedback information to be used in SU-MIMO transmission (hereinafter referred to as "SU-MIMO transmission feedback information"), and, apart from this, generate feedback information to be used in MU-MIMO transmission (hereinafter referred to as "MU-MIMO transmission feedback information"), and feed these back to the base station apparatus eNode B. In this case, the SU-MIMO transmission feedback information (LTE feedback information) includes a CQI (hereinafter referred to as "$CQI^{(SU)}$ for SU-MIMO transmission" or simply referred to as "$CQI^{(SU)}$") with respect to which MAI is not estimated, and the MU-MIMO transmission feedback information includes a CQI (hereinafter referred to as "$CQI^{(MU)}$ for MU-MIMO transmission" or simply referred to as "$CQI^{(MU)}$") with respect to which MAI is estimated.

However, when MU-MIMO transmission feedback information is fed back apart from SU-MIMO transmission feedback information in this way, the amount of information with feedback information for the base station apparatus eNode B increases. A $CQI^{(MU)}$ generally has an equal or a greater number of bits than a $CQI^{(SU)}$. Consequently, the number of bits required when feedback information for SU-MIMO transmission and MU-MIMO transmission is fed back is more than double the number of bits for when feeding back feedback information for SU-MIMO transmission alone.

Also, as described earlier, deterioration of the accuracy of $CQI^{(MU)}$ is obvious especially when the correlation between antennas is low. On the other hand, when the correlation between antennas is high, the actual channel quality is reflected, so that the data rate in MU-MIMO transmission is unlikely to fall even when the $CQI^{(SU)}$ included in SU-MIMO transmission feedback information (LTE feedback information) is used. Given this situation, feeding back feedback information for SU-MIMO transmission and MU-MIMO transmission is not preferable from the perspective of improving the data rate. The present inventor has focused on the fact that, due to assuming the Hermitian transpose of a precoding matrix corresponding to $PMI_k$ selected in a mobile station apparatus UE as a channel matrix (effective channel $h_{k,eff}^H$), the situation occurs where the accuracy of $CQI_k$ may deteriorate, depending on the correlation between antennas, and the data rate upon MU-MIMO transmission is lower, and have arrived at the present invention.

That is to say, an essence of the present invention is that, when the Hermitian transpose of a precoding matrix corresponding to $PMI_k$ selected in a mobile station apparatus UE is assumed as a channel matrix effective channel $h_{k,eff}^H$, complementary information that improves the accuracy of $CQI_k$, which deteriorates depending on the correlation between antennas, is generated, and this complementary information is added to the LTE feedback information (SU-MIMO transmission feedback information). For example, $RI_k$, $PMI_k$ and $CQI_k$ shown in FIG. 3 and FIG. 4 match the LTE feedback information. In the base station apparatus eNode B, by means of this complementary information, it is possible to adjust the accuracy of $CQI_k$ included in the LTE feedback information and select a precoding weight according to $CQI_k$ after the adjustment. By this means, even when the correlation between antennas is low and $CQI_k$ included in the LTE feedback information and the actual channel quality do not match, it is still possible to perform precoding by an adequate precoding weight that matches the actual channel quality. Also, since complementary information to complement the accuracy of $CQI^{(SU)}$ is added to the LTE feedback information, compared to the case of adding and feeding back MU-MIMO transmission feedback information, it is possible to prevent the amount of feedback information from increasing significantly. As a result of this, it is possible to reduce the increase of the amount of feedback information and also increase the data rate upon MIMO transmission regardless of whether the correlation between antennas is high or low.

The complementary information includes information to complement the difference between $CQI_k$ ($CQI^{(SU)}$) included in the LTE feedback information and $CQI^{(MU)}$, in the base station apparatus eNode B. For example, the complementary information includes information to allow $CQI^{(MU)}$ to be calculated from $CQI_k$ ($CQI^{(SU)}$) included in the LTE feedback information, in the base station apparatus eNode B. To be more specific, the complementary information includes difference information between $CQI^{(SU)}$ that is calculated without estimating MAI, and $CQI^{(MU)}$ that is calculated by estimating MAI, and quantization error information that is produced when the Hermitian transpose of the precoding matrix corresponding to $PMI_k$ selected in the mobile station apparatus UE is assumed to be an effective channel $h_{k,eff}^H$.

With the feedback information transmission method according to the first mode of the present invention, at the mobile station apparatus UE, difference information (hereinafter referred to as "CQI difference information") between $CQI^{(SU)}$ that is calculated without estimating MAI and $CQI^{(MU)}$ that is calculated by estimating MAI is generated, and this CQI difference information is added to the LTE feedback information as complementary information and fed back to the base station apparatus eNode B.

Figure 7:
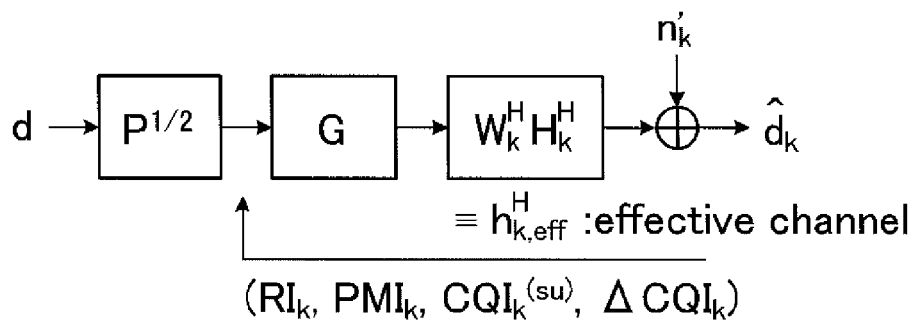
FIG. 7 is a processing conceptual diagram of a MIMO system to which the feedback information transmission method according to the first mode of the present invention is applied.

FIG. 7 is a processing conceptual diagram of a MIMO system to which the feedback information transmission method according to the first mode of the present invention is applied. As shown in FIG. 7, in the MIMO system to which the feedback information transmission method according to the first mode is applied, CQI difference information ($\Delta CQI_k$) is added to $RI_k$, $PMI_k$ and $CQI_k^{(SU)}$ constituting the LTE feedback information, and fed back to the base station apparatus eNode B.

Here, the method of calculating CQI difference information to be fed back in the feedback information transmission method according to the first mode will be described. A $CQI^{(SU)}$ that is calculated without estimating MAI is determined by equation 11. On the other hand, a $CQI^{(MU)}$ that is calculated by estimating MAI is determined by equation 12:

$$CQI_k^{(SU)} = P_{Tx}\|h_{k,\mathit{eff}}\|^2\cos^2\theta_k \quad \text{(Equation 11)}$$

$$CQI_k^{(MU)} = \frac{\frac{P_{Tx}}{N_T}\|h_{k,\mathit{eff}}\|^2\cos^2\theta_k}{1+\frac{P_{Tx}}{N_T}\|h_{k,\mathit{eff}}\|^2\sin^2\theta_k} \quad \text{(Equation 12)}$$

Here, "$P_{TX}$" represents the total transmission power, and "$N_T$" represents the number of transmitting antennas. Also, "$h_{k,\mathit{eff}}$" is the effective channel matrix for the k-th mobile station apparatus UE, "$\theta k$" is the quantization error angle for the k-th mobile station apparatus UE. Note that the calculation of this quantization error angle will be described in relationship to the feedback information transmission method according to the second mode. Also, the equation of the denominator part of the right term of equation 12 is MAI in k-th mobile station apparatus UE.

The CQI difference information $\Delta CQI_k$ is determined by equation 13 using $CQI_k^{(SU)}$ determined by equation 11 and $CQI_k^{(MU)}$ determined by equation 12:

$$\Delta CQI_k = CQI_k^{(SU)} - N_T CQI_k^{(MU)} \xrightarrow{\theta_k=0} 0 \quad \text{(Equation 13)}$$

Note that, as shown in equation 13, the CQI difference information $\Delta CQI_k$ is calculated to show that there is no difference between $CQI_k^{(SU)}$ and $CQI_k^{(MU)}$ when the quantization error angle $\theta_k$ is 0°.

In the MIMO system to which the feedback information transmission method according to the first mode is applied, the CQI difference information $\Delta CQI_k$ calculated in this way is fed back to the base station apparatus eNode B with $RI_k$, $PMI_k$ and $CQI_k^{(SU)}$, which are the LTE feedback information. In the base station apparatus eNode B, by adjusting the accuracy of $CQI_k^{(SU)}$ included in the LTE feedback information by this CQI difference information $\Delta CQI_k$, it is possible to determine $CQI^{(MU)}$ and select a precoding weight according to this $CQI_k^{(MU)}$. By this means, even when the correlation between antennas is low and $CQI_k$ ($CQI_k^{(SU)}$) included in the LTE feedback information and the actual channel quality do not match each other, it is still possible to perform precoding for each transmitting antenna by an adequate precoding weight that matches the actual channel quality. Also, since the CQI difference information $\Delta CQI_k$ is substantially smaller than $CQI^{(SU)}$, it is possible to prevent the amount of feedback information from increasing significantly compared to the case of adding and feeding back MU-MIMO transmission feedback information. As a result of this, it is possible to reduce the increase of the amount of feedback information and also increase the data rate upon MIMO transmission regardless of whether the correlation between antennas is high or low.

In particular, with the feedback information transmission method according to the first mode, the number of bits of the CQI difference information $\Delta CQI_k$ becomes greater when the correlation between, antennas is lower or becomes smaller when the correlation between antennas is higher. This means that the CQI difference information $\Delta CQI_k$ corresponds to the amount of quantization error corresponding to the correlation between antennas. Consequently, when the correlation between antennas is high, it is possible to further reduce the increase of the amount of feedback information.

For example, with the feedback information transmission method according to the first mode, the number of bits of the CQI difference information $\Delta CQI_k$ is set to a smaller number of bits than the number of bits of $CQI_k^{(SU)}$ included in the LTE feedback information. By setting the number of the CQI difference information $\Delta CQI_k$ to a smaller number of bits than the number of bits of $CQI_k^{(SU)}$, it is possible to effectively reduce the increase of the amount of feedback information to the base station apparatus eNode B.

Also, according to the first mode feedback information transmission method, the number of CQI difference information $\Delta CQI_k$ can be set to one bit. When the number of bits of the CQI difference information $\Delta CQIk$ is set to one bit in this way, it becomes possible to minimize the amount of information to be added to the LTE feedback information, and report the accuracy of $CQI^{(SU)}$ included in the LTE feedback information and whether or not it needs to be corrected, to the base station apparatus eNode B.

Note that, when the mobile station apparatus UE feeds back the number of layers (rank) as "2" by means of $RI_k$, the LTE feedback information includes two $CQI_k$s (here, assume "$CQI1_k^{(SU)}$" and "$CQI2_k^{(SU)}$") which correspond to the codewords of the respective layers. In this case, with the feedback information transmission method according to the first mode, CQI difference information $\Delta CQI1_k$ and $\Delta CQI2_k$, corresponding to $CQI1_k^{(SU)}$ and $CQI2_k^{(SU)}$, respectively, are added and fed back to the base station apparatus eNode B.

Figure 8A:
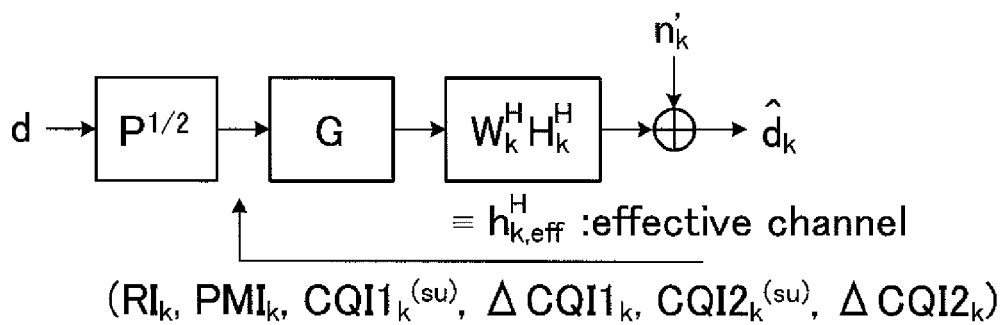
FIG. 8 is a diagram for explaining feedback information of a MIMO system to which the feedback information transmission method according to the first mode is applied.

FIG. 8 is a diagram for explaining feedback information of a MIMO system to which the feedback information transmission method according to the first mode is applied. In the present MIMO system, when the mobile station apparatus UE feeds back the number of layers "2" by $RI_k$, as shown in FIG. 8A, the CQI difference information $\Delta CQI1_k$ and $\Delta CQI2_k$ are added to $RI_k$, $PMI_k$, and $CQI1_k^{(SU)}$, which constitute the LTE feedback information, and to $CQI2_k^{(SU)}$, and fed back to the base station apparatus eNode B. Note that the CQI difference information $\Delta CQI1_k$ and $\Delta CQI2_k$ are calculated based on equation 11 to equation 13 described above.

In this case, even when the base station apparatus eNode B assigns two stream to the mobile station apparatus UE and performs MU-MIMO transmission, the accuracy of $CQI1_k^{(SU)}$ and $CQI2_k^{(SU)}$ included in the LTE feedback information is adjusted by these CQI difference information $\Delta CQI1_k$ and $\Delta CQI2_k$, so that it is possible to determine $CQI1_k^{(MU)}$ and $CQI2_k^{(MU)}$ and select precoding weights in accordance with these $CQI1_k^{(MU)}$ and $CQI2_k^{(MU)}$. By this means, when MU-MIMO transmission is performed by assigning two streams to the mobile station apparatus UE, even when $CQI1_k^{(SU)}$ and $CQI2_k^{(SU)}$ included in the LTE feedback information and the actual channel quality do not match, it is still possible to perform precoding for each transmitting antenna by an adequate precoding weight that matches the actual channel quality.

Figure 8B:
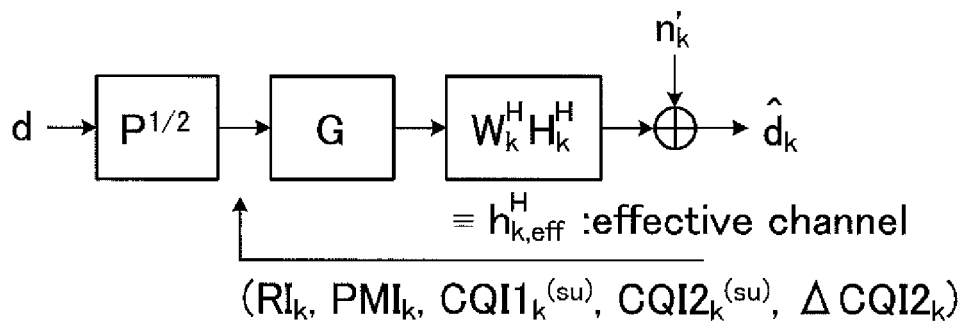

Also, when the mobile station apparatus UE makes the number of layers (rank) "2" by $RI_k$ and feeds back two of $CQI1_k^{(SU)}$ and $CQI2_k^{(SU)}$ in the LTE feedback information, with the feedback information transmission method according to the first mode, as shown in FIG. 8B, it is possible to add the CQI difference information $\Delta CQI1_k$ or $\Delta CQI2_k$ of the one having the greater value between $CQI1_k^{(SU)}$ and $CQI2_k^{(SU)}$, and send feedback to the base station apparatus eNode B. Note that FIG. 8B shows a case where the value of $CQI2_k^{(SU)}$ is greater than the value of $CQI1_k^{(SU)}$.

In this case, even when the base station apparatus eNode B assigns two streams to the mobile station apparatus UE in SU-MIMO transmission and on the other hand assigns one stream in MU-MIMO transmission and MIMO transmission is performed, by adjusting the accuracy of $CQI1_k^{(SU)}$ and $CQI2_k^{(SJ)}$ included in the LTE feedback information by this CQI difference information $\Delta CQI1_k$ or $\Delta CQI2_k$, it is possible to determine $CQI1_k^{(MU)}$ and $CQI2_k^{(MU)}$, and select precoding weights in accordance with these $CQI1_k^{(MU)}$ and $CQI2_k^{(MU)}$. By this means, even when MIMO transmission is performed by assigning two streams to the mobile station apparatus UE in SU-MIMO transmission and by assigning one stream in MU-MIMO transmission, even if $CQI1_k^{(SU)}$ and $CQI2_k^{(SU)}$ included in the LTE feedback information and the actual channel quality do not match, it is still possible to perform precoding for each transmitting antenna by an adequate precoding weight that matches the actual channel quality.

With the feedback information transmission method according to a second mode of the present invention, quantization error information is calculated, which is produced when the Hermitian transpose of a precoding matrix corresponding to $PMI_k$ selected in a mobile station apparatus UE is assumed as an effective channel $h_{k,eff}^H$, and this quantization error information is added to the LTE feedback information as complementary information and fed back to the base station apparatus eNode B.

Figure 9:
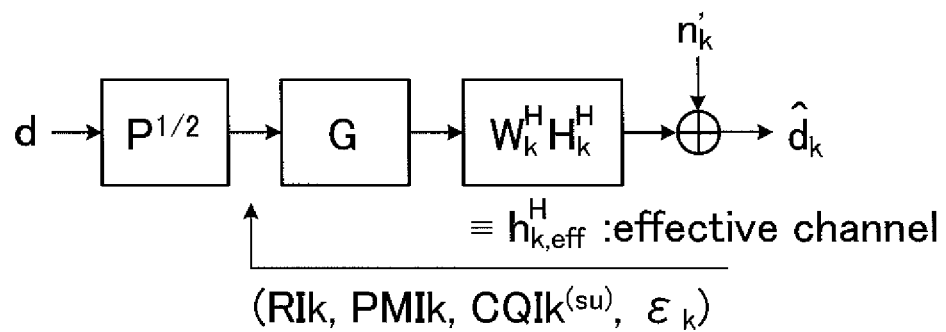
FIG. 9 is a processing conceptual diagram of a MIMO system to which the feedback information transmission method according to a second mode of the present invention is applied.

FIG. 9 is a processing conceptual diagram of a MIMO system to which the feedback information transmission method according to the second mode of the present invention is applied. As shown in FIG. 9, in a MIMO system to which the feedback information transmission method according to the second mode is applied, quantization error information ($\epsilon_k$) is added to $RI_k$, $PMI_k$ and $CQI^{(SU)}$ that constitute the LTE feedback information, and fed back to the base station apparatus eNode B.

Figure 10:
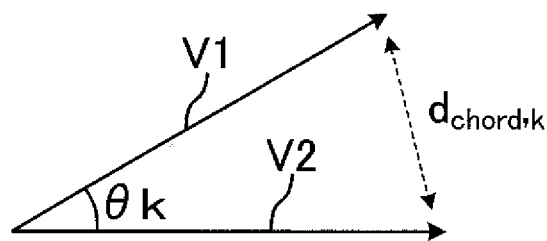
FIG. 10 is a diagram for explaining quantization error information that is fed back in the feedback information transmission method according to a second mode.

Here, quantization error information ($\epsilon k$) that is fed back in the feedback information transmission method according to the second mode will be described. FIG. 10 is a diagram for explaining quantization error information that is fed back in the feedback information transmission method according to the second mode. Note that FIG. 10 shows, for ease of explanation, a precoding matrix that is selected in the mobile station apparatus UE and an effective channel $h_{k,eff}^H$, which is the Hermitian transpose of this precoding matrix, in vector components.

FIG. 10 shows a vector $V_1$ (the first vector) corresponding to the precoding matrix selected in the mobile station apparatus UE, and a vector $V_2$ (second vector) corresponding to the effective channel $h_{k,eff}^H$, which is the Hermitian transpose of this precoding matrix. These vectors $V_1$ and $V_2$ are oriented in substantially the same direction when the antenna correlation is high, and, on the other hand, are oriented in varying directions when the antenna correlation is low. With the feedback information transmission method according to the second mode, information that is determined from the difference between the directions of these vectors $V_1$ and $V_2$ is used as quantization error information ($\epsilon_k$).

For example, with the feedback information transmission method according to the second mode, it is possible to calculate the angle $\theta_k$ between vector $V_1$ and vector $V_2$, that is to say, the angle of quantization error (quantization error angle), and use this quantization error angle $\theta_k$ as quantization error information $\epsilon_k$. Note that, regarding this quantization error angle $\theta_k$, for example, it is possible to determine $\cos \theta_k$ by equation 14 and calculate $\theta_k$ from this. Also, with the feedback information transmission method according to the second mode, it is possible to calculate the chordal distance $d_{chord,k}$ between vector $V_1$ and vector $V_2$ and use this chordal distance $d_{chord,k}$ as quantization error information $\epsilon_k$. Note that this chordal distance $d_{chord,k}$ is, for example, determined by equation 15:

$$\cos \theta_k = \frac{|a^H b|}{\|a\|\|b\|} \quad \text{(Equation 14)}$$

$$d_{chord}(A, B) = \frac{1}{\sqrt{2}} \|AA^H - BB^H\|_F \quad \text{(Equation 15)}$$

Here, "a" and "A" are a precoding matrix selected in the mobile station apparatus UE, and "b" and "B" represent an effective channel $h_{k,eff}^H$, which is the Hermitian transpose of this precoding matrix.

In the MIMO system to which the feedback information transmission method according to the second mode is applied, quantization error information $\epsilon_k$ calculated in this way is fed back to the base station apparatus eNode B, with $RI_k$, $PMI_k$ and $CQI^{(SU)}$, which are the LTE feedback information. In the base station apparatus eNode B, by adjusting the accuracy of $CQI^{(SU)}$ included in the LTE feedback information by this quantization error information $\epsilon_k$, it is possible to determine $CQI^{(MU)}$ and select a precoding weight according to this $CQI^{(MU)}$. By this means, even when the correlation between antennas is low and $CQI_k$ included in the LTE feedback information and the actual channel quality do not match each other, it is possible to perform precoding for each transmitting antenna by an adequate precoding weight that matches the actual channel quality. Also, since the quantization error information $\epsilon_k$ is substantially smaller than $CQI^{(SU)}$, it is possible to prevent the amount of feedback information from increasing significantly compared to the case of adding and feeding back MU-MIMO transmission feedback information. As a result of this, it is possible to reduce the increase of the amount of feedback information and also increase the data rate upon MIMO transmission regardless of whether the correlation between antennas is high or low.

In particular, in a MIMO system to which the feedback information transmission method according to the second mode is applied, when the quantization error angle $\theta_k$ is used as quantization error information $\epsilon_k$, for example, it is possible to calculate $CQI^{(MU)}$ for MU-MIMO transmission of equation 12 using SU-MIMO transmission feedback information of rank 1 of equation 11 in the base station apparatus eNode B. Also, when the chordal distance $d_{chord,k}$ is used as quantization error information $\epsilon_k$, it is possible to calculate $CQI^{(MU)}$ for MU-MIMO transmission, including ranks other than rank 1, in the base station apparatus eNode B. That is to say, more generalized CQI correction is possible than when using the quantization error angle $\theta_k$.

For example, with the feedback information transmission method according to the second mode, the number of bits of the quantization error information ($\epsilon_k$) is set to a smaller number of bits than the number of bits of $CQI_k^{(SU)}$ included in the LTE feedback information. By setting the number of the quantization error information $\epsilon_k$ to a smaller number of bits than the number of bits of $CQI_k^{(SU)}$, it is possible to effectively reduce the increase of the amount of feedback information to the base station apparatus eNode B.

Also, with the feedback information transmission method according to the second mode, it is possible to set the number of bits of quantization error information $\epsilon_k$ to one bit. In this way, when the number of bits of quantization error information $\epsilon_k$ is set to one bit, it is possible to reduce the amount of information to be added to the LTE feedback information to a minimum and report the accuracy when $CQI^{(SU)}$ included in the LTE feedback information is made $CQI^{(MU)}$ for MU-MIMO, and whether or not it should be corrected, to the base station apparatus eNode B.

Also, when the mobile station apparatus UE makes the number of layers (rank) "2" by $RI_k$ and feeds back two $CQI_k$s (here, assume "$CQI1_k^{(SU)}$" and "$CQI2_k^{(SU)}$") in the LTE feedback information, with the feedback information transmission method according to the second mode, quantization error information $\epsilon 1_k$ and $\epsilon 2_k$ are added to corresponding $CQI1_k^{(SU)}$ and $CQI2_k^{(SU)}$ and fed back to the base station apparatus eNode B.

Figure 11A:
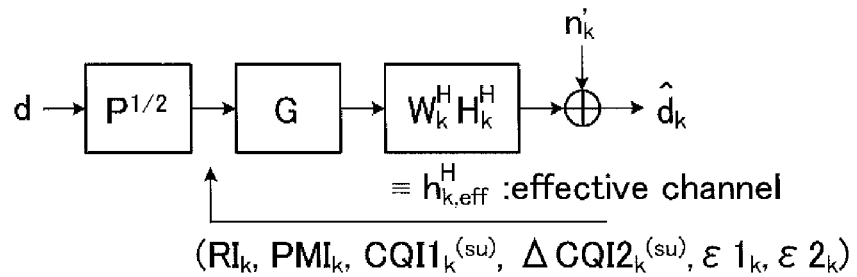
FIG. 11 is a diagram for explaining feedback information of a MIMO system to which the feedback information transmission method according to the second mode is applied.

FIG. 11 is a diagram for explaining feedback information of a MIMO system to which the feedback information transmission method according to the second mode is applied. In the present MIMO system, when the mobile station apparatus UE feeds back the number of layers "2" by $RI_k$, as shown in FIG. 11A, quantization error information $\epsilon 1_k$ and $\epsilon 2_k$ are added to $RI_k$, $PMI_k$ and $CQI1_k^{(SU)}$, which constitute the LTE feedback information, and to $CQI2_k^{(SU)}$, and fed back to the base station apparatus eNode B. Note that these quantization error information $\epsilon 1_k$ and $\epsilon 2_k$ are determined as described above.

In this case, even when the base station apparatus eNode B assigns two streams to the mobile station apparatus UE and performs MU-MIMO transmission, the accuracy of $CQI1_k^{(SU)}$ and $CQI2_k^{(SU)}$ included in the LTE feedback information is adjusted by these quantization error information $\epsilon 1_k$ and $\epsilon 2_k$, so that it is possible to determine $CQI1_k^{(MU)}$ and $CQI2_k^{(MU)}$ and select precoding weights in accordance with these $CQI1_k^{(MU)}$ and $CQI2_k^{(MU)}$. By this means, when MU-MIMO transmission is performed by assigning two streams to the mobile station apparatus UE, even when $CQI1_k^{(SU)}$ and $CQI2_k^{(SU)}$ included in the LTE feedback information and the actual channel quality do not match each other, it is still possible to perform precoding for each transmitting antenna by an adequate precoding weight that matches the actual channel quality.

Figure 11B:
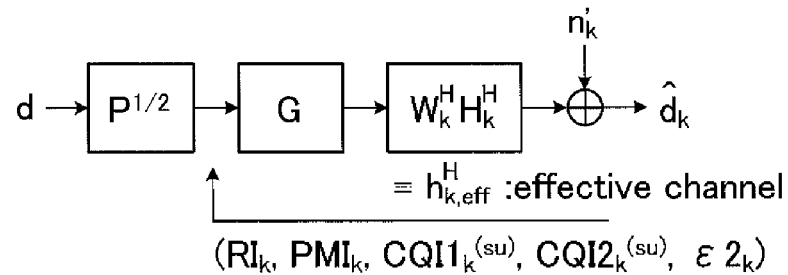

Also, when the mobile station apparatus UE makes the number of layers (rank) "2" by $RI_k$ and feeds back two of $CQI1_k^{(SU)}$ and $CQI2_k^{(SU)}$ in the LTE feedback information, with the feedback information transmission method according to the second mode, as shown in FIG. 11B, it is possible to add the quantization error information $\epsilon 1_k$ or $\epsilon 2_k$ of the one having the greater value between $CQI1_k^{(SU)}$ and $CQI2_k^{(SU)}$, and send feedback to the base station apparatus eNode B. Note that FIG. 11B shows a case where the value of $CQI2_k^{(SU)}$ is greater than the value of $CQI1_k^{(SU)}$.

In this case, even when the base station apparatus eNode B assigns two streams to the mobile station apparatus UE in SU-MIMO transmission and on the other hand assigns one stream in MU-MIMO transmission and MIMO transmission is performed, by adjusting the accuracy of $CQI1_k^{(SU)}$ and $CQI2_k^{(SU)}$ included in the LTE feedback information by this quantization error information $\epsilon 1_k$ or $\epsilon 2_k$, it is possible to determine $CQI1_k^{(MU)}$ and $CQI2_k^{(MU)}$, and select precoding weights in accordance with these $CQI1_k^{(MU)}$ and $CQI2_k^{(MU)}$. By this means, even when MIMO transmission is performed by assigning two streams to the mobile station apparatus UE in SU-MIMO transmission and by assigning one stream in MU-MIMO transmission, even if $CQI1_k^{(SU)}$ and $CQI2_k^{(SU)}$ included in the LTE feedback information and the actual channel quality do not match, it is still possible to perform precoding for each transmitting antenna by an adequate precoding weight that matches the actual channel quality.

Now, in an MIMO system of the LTE-A scheme, as a technology to anticipate reduced quantization error in the quantization process in the mobile station apparatus UE upon MU-MIMO transmission and a reduced amount of feedback information for the base station apparatus eNode B, a method of preparing two codebooks (hereinafter referred to as "double codebooks" when appropriate) in both the mobile station apparatus UE and base station apparatus eNode B and feeding back feedback information in different cycles, is under study.

In a MIMO system to utilize double codebooks in this way, it is planned to use one codebook as a long-cycle codebook and use the other codebook as a short-cycle codebook. In this MIMO system, the effective codebook size can be increased by preparing two codebooks, so that reduction of quantization error in the quantization process in the mobile station apparatus UE is anticipated. Also, with the long-cycle codebook, given that it is not necessary to feed back feedback information so frequently compared to the short-cycle codebook, reduction of feedback information is anticipated.

Figure 12:
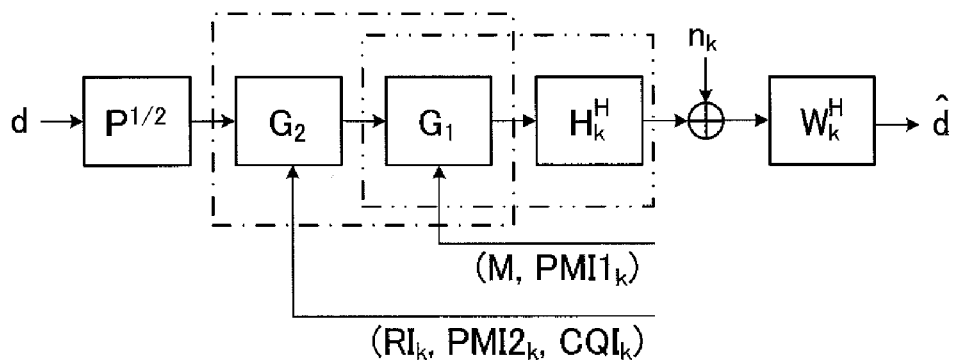
FIG. 12 is a processing conceptual diagram of a MIMO system using double codebooks.

FIG. 12 is a processing conceptual diagram of a MIMO system utilizing double codebooks. The MIMO system shown in FIG. 12 is different from the MIMO system of the LTE scheme in that transmission data d, which has been subjected to transmission power control by a transmission power control matrix $P^{1/2}$, has its phase/amplitude amount controlled (shifted) by precoding matrices $G_1$ and $G_2$ for the mobile station apparatus UE. Note that the point that these precoding matrices $G_1$ and $G_2$ are selected based on feedback information that is fed back from the mobile station apparatus UE is the same as in the MIMO system of the LTE scheme.

Here, precoding matrix $G_1$ is a precoding matrix to be selected from the long-cycle codebook described above. This long-cycle codebook has the same configuration as the codebook used in the MIMO system of the LTE scheme, and defines the precoding matrices to correspond to the transmitting antennas $N_{TX} \times M$ (where "M" is a predetermined rank and is an integer smaller than the transmitting antennas $N_{TX}$ (for example, "2")). Also, the long-cycle codebook defines a precoding matrix for low ranks (for example, ranks 1 and 2), thereby constituting a codebook for high-correlation, which is used when the correlation between antennas is high. Precoding matrix $G_1$ is selected, from the long-cycle codebook, based on a predetermined rank M and $PMI1_k$ that are fed back from the mobile station apparatus UE.

On the other hand, precoding matrix $G_2$ is a precoding matrix to be selected from the short-cycle codebook described above. This short-cycle codebook is formed with a plurality of (M×RI) codebooks. For example, in the event there are four transmitting antennas $N_{TX}$, a plurality of codebooks, which define the precoding matrices to correspond to $4\times\{1, \ldots, 4\}$, $3\times\{1, 2, 3\}$, $2\times\{1, 2\}$ and $1\times 1$, are provided. Also, the short-cycle codebook defines a precoding matrix for a high rank (for example, rank 4), thereby constituting a low-correlation codebook, which is used when the correlation between antennas is low. Precoding matrix $G_2$ is selected, from the short-cycle codebook, based on predetermined $RI_k$, $PMI2_k$ and $CQI_k$ that are fed back from the mobile station apparatus UE.

In a MIMO system utilizing double codebooks, as shown by the frame of one-point chained lines shown in FIG. 12, it is possible to interpret this to mean that precoding is performed by precoding matrices $G_1$ and $G_2$. It is also possible to interpret this to mean that, as shown by the frame of two-point chained lines shown in FIG. 12, precoding matrix $G_2$ is selected with respect to a channel matrix $H_k^{H_1}$, which is given by performing precoding of a channel matrix $H_k^H$ by precoding matrix $G_1$.

Generally speaking, the channel matrix $H_k^H$ varies frequently, but its statistical characteristics do not vary significantly (for example, the matrix to represent the correlation between antennas). Precoding matrix $G_1$ is selected based on such characteristics of channel matrix $H_k^H$. By performing precoding by precoding matrix $G_1$ selected in this way, the channel matrix $H_k^{H_1}$ is compressed without losing information of the channel matrix $H_k^H$. On the other hand, precoding matrix G2 is selected in accordance with the channel matrix $H_k^{H_1}$ compressed in this way, so that its amount of information can be reduced. Consequently, it is also possible to reduce the amount of feedback information for specifying the channel matrix $H_k^{H_1}$ from the mobile station apparatus UE. This effect of reducing the amount of feedback information can be achieved in the event the antenna correlation is high.

With the feedback information transmission methods according to the first and second modes, complementary information (CQI difference information $\Delta CQI_k$ and quantization error information $\epsilon_k$) is valuable information to calculate $CQI^{(MU)}$ upon MU-MIMO transmission, and yet becomes information that carries no substantial meaning at ranks equal to or greater than rank 3, where MU-MIMO transmission does not apply. Consequently, it is possible to add such complementary information to LTE feedback information only at ranks 1 and 2, which are subject to MU-MIMO transmission. However, in this case, the number of bits of feedback information varies depending on ranks (to be more specific, ranks 1 and 2 and ranks equal to or greater than rank 3), and therefore it becomes necessary to manage feedback information differently, and a problem that the process becomes complex might occur.

On the other hand, in a MIMO system to utilize double codebooks, as described above, there is a plan to reduce the number of bits of feedback information when the correlation between antennas is high (for example, at ranks 1 and 2). If complementary information is assigned to the part where this amount of information is reduced, it becomes possible to avoid the situation where the number of bits of feedback information varies depending on ranks (to be more specific, ranks 1 and 2, and ranks equal to or greater than rank 3), and manage feedback information all in a common fashion. Also, this is preferable also from the perspective that MU-MIMO transmission can effectively increase the data rate when the correlation between antennas is high.

From this perspective, with the feedback information transmission method according to a third mode, in a MIMO system utilizing double codebooks, complementary information is added to LTE feedback information only at ranks 1 and 2 (when the correlation between antennas is high), and, on the other hand, at ranks equal to or greater than rank 3, complementary information is not added, and LTE feedback information alone is fed back. In this case, the number of bits given by adding the number of bits of the complementary information to the number of bits of part of the LTE feedback information at ranks 1 and 2, and the number of bits of part of the LTE feedback information at rank 3 or above, are made the same.

For example, a case will be described here where, as the number of bits of part of LTE feedback information, the number of bits required to feed back a PMI is L bits and the number of bits required to feed back complementary information is N bits, will be described. In this case, with the feedback information transmission method according to the third mode, L bits are assigned to the PMI feedback and also N bits are assigned to the complementary information feedback at ranks 1 and 2. On the other hand, at rank 3 or above, (L+N) bits are assigned to the PMI feedback. In this way, by making the number of bits given by adding the number of bits of complementary information to the number of bits of part of the LTB feedback information at ranks 1 and 2, and the number of bits of part of the LTE feedback information at rank 3 or above the same, it becomes possible to avoid the situation where the number of bits of feedback information varies depending on ranks (to be more specific, ranks 1 and 2, and ranks equal to or greater than rank 3), and manage feedback information all in a common fashion.

Now, an embodiment of the present invention will be described below in detail with reference to the accompanying drawings. A case will be described here where a base station apparatus and mobile station apparatus to support the LTE-A system are used.

Figure 13:
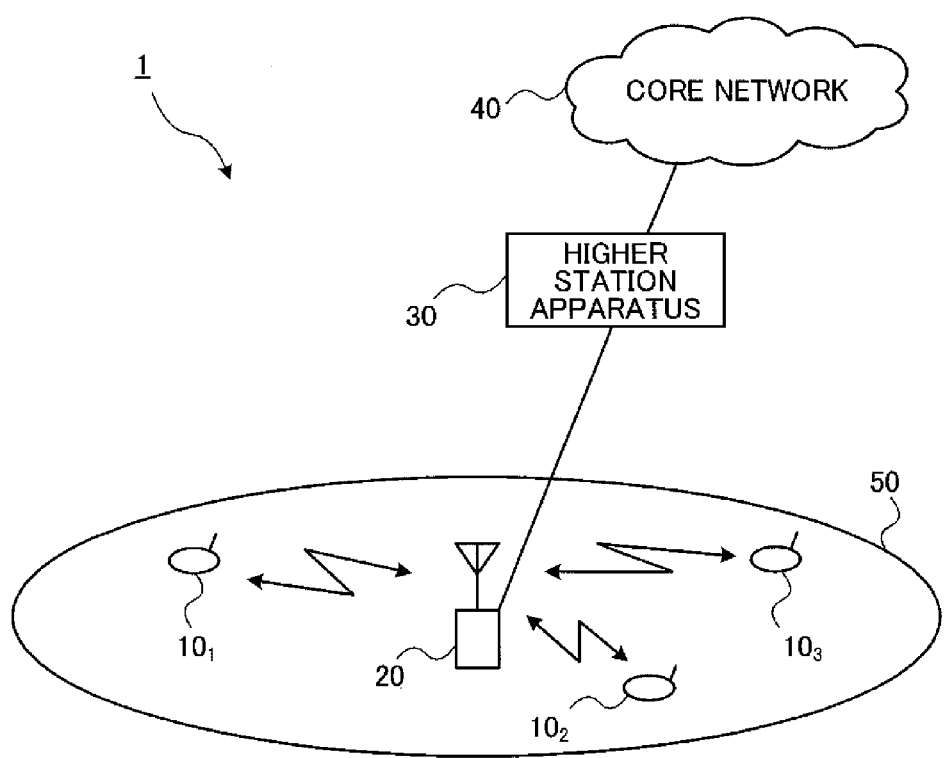
FIG. 13 is a diagram for explaining a configuration of a mobile communication system having a mobile station apparatus and a base station apparatus according to an embodiment of the present invention.

Referring to FIG. 13, a mobile communication system 1 having a mobile station apparatus (UE) 10 and a base station apparatus (eNode B) 20 according to an embodiment of the present invention will be described. FIG. 13 is a diagram for explaining the configuration of the mobile communication system 1 having the mobile station apparatus 10 and base station apparatus 20 according to an embodiment of the present invention. Note that the mobile communication systems 1 illustrated in FIG. 13 is a system to accommodate, for example, the LTE system or SUPER 3G. This mobile communication system 1 may be referred to as IMT-Advanced or may be referred to as 4G.

As illustrated in FIG. 13, the mobile communication system 1 is configured to include the base station apparatus 20 and a plurality of mobile station apparatuses 10 ($10_1$, $10_2$, $10_3$, ... $10_n$, where n is an integer to satisfy n>0) that communicate with this base station apparatus 20. The base station apparatus 20 is connected with a higher station apparatus 30, and this higher station apparatus 30 is connected with a core network 40. The mobile station apparatus 10 communicates with the base station apparatus 20 in a cell 50. Note that the higher station apparatus 30 includes, for example, an access gateway apparatus, a radio network controller (RNC), a mobility management entity (MME) and so on, but is by no means limited to these.

The mobile station apparatuses ($10_1$, $10_2$, $10_3$, ... $10_n$) have the same configuration, functions and state, so that the following descriptions will be given with respect to "mobile station apparatus 10," unless specified otherwise. Also, although the mobile station apparatus 10 performs radio communication with the base station apparatus 20 for ease of explanation, more generally, user apparatuses (UE: User Equipment) including mobile station apparatuses and fixed terminal apparatuses may be used.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, a system band into bands formed with one or continuous resource blocks, and allowing a plurality of terminals to use mutually different bands.

Here, the communication channels in the LTE system will be described. As for the downlink, a PDSCH that is used by each mobile station apparatus 10 on a shared basis, and downlink L1/L2 control channels (including the PDCCH (Physical Downlink Control Channel), PCFICH (Physical Control Format Indicator Channel) and PHICH (Physical Hybrid-ARQ Indicator Channel)) are used. By means of this PDSCH, user data, that is, normal data signals, is transmitted. Transmission data is included in this user data. Note that the component carriers CCs and scheduling information that are assigned to the mobile station apparatus 10 by the base station apparatus 20 are reported to the mobile station apparatus 10 by the L1/L2 control channels.

On the uplink, a PUSCH (Physical Uplink Shared Channel), which is used by each mobile station apparatus 10 on a shared basis, and a PUCCH (Physical Uplink Control Channel), which is an uplink control channel, are used. User data is transmitted by means of this PUSCH. Furthermore, by means of this PUCCH, downlink radio quality information (CQI: Channel Quality Indicator) and so on are transmitted.

Figure 14:
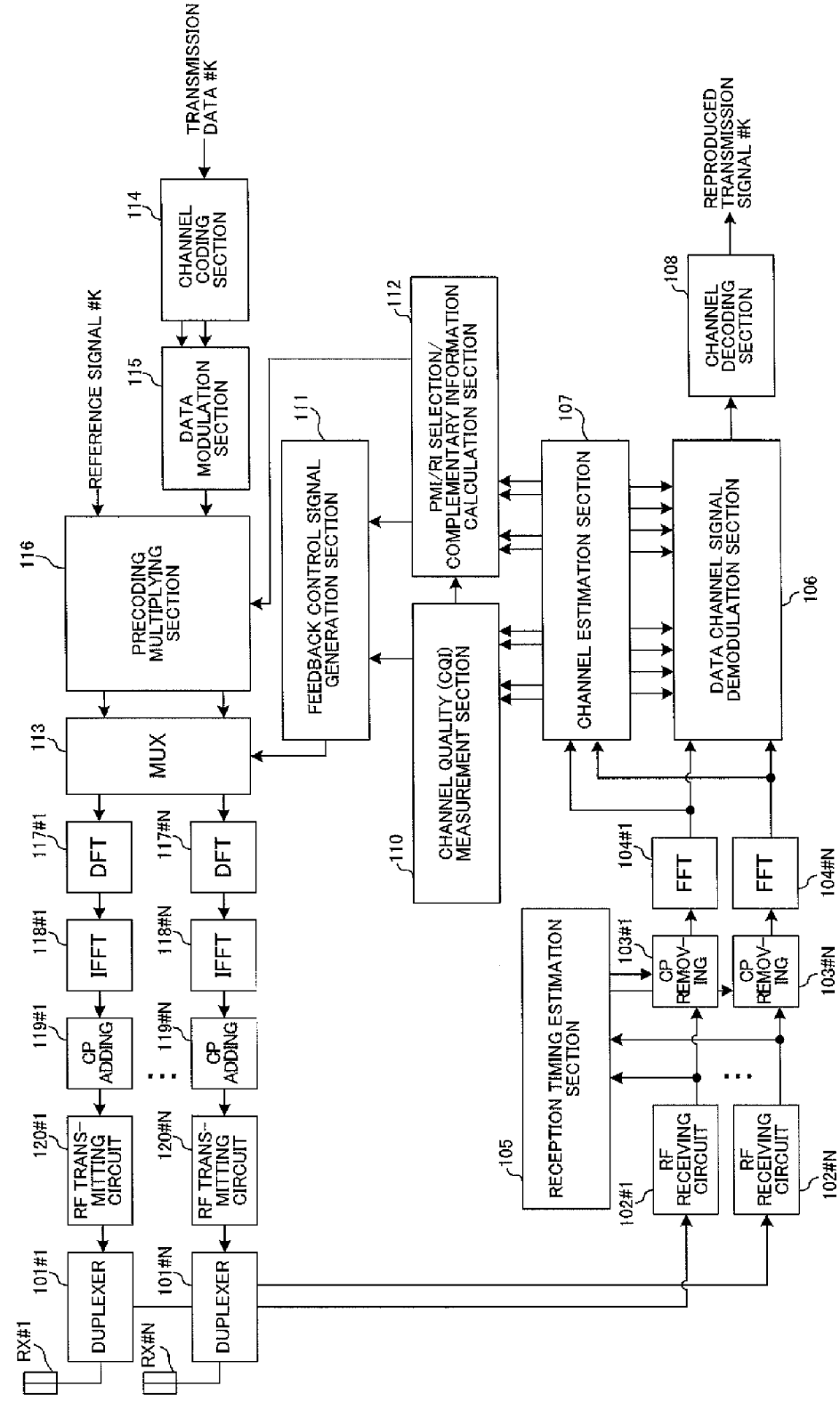
FIG. 14 is a block diagram showing a configuration of a mobile station apparatus according to the present embodiment.
Figure 15:
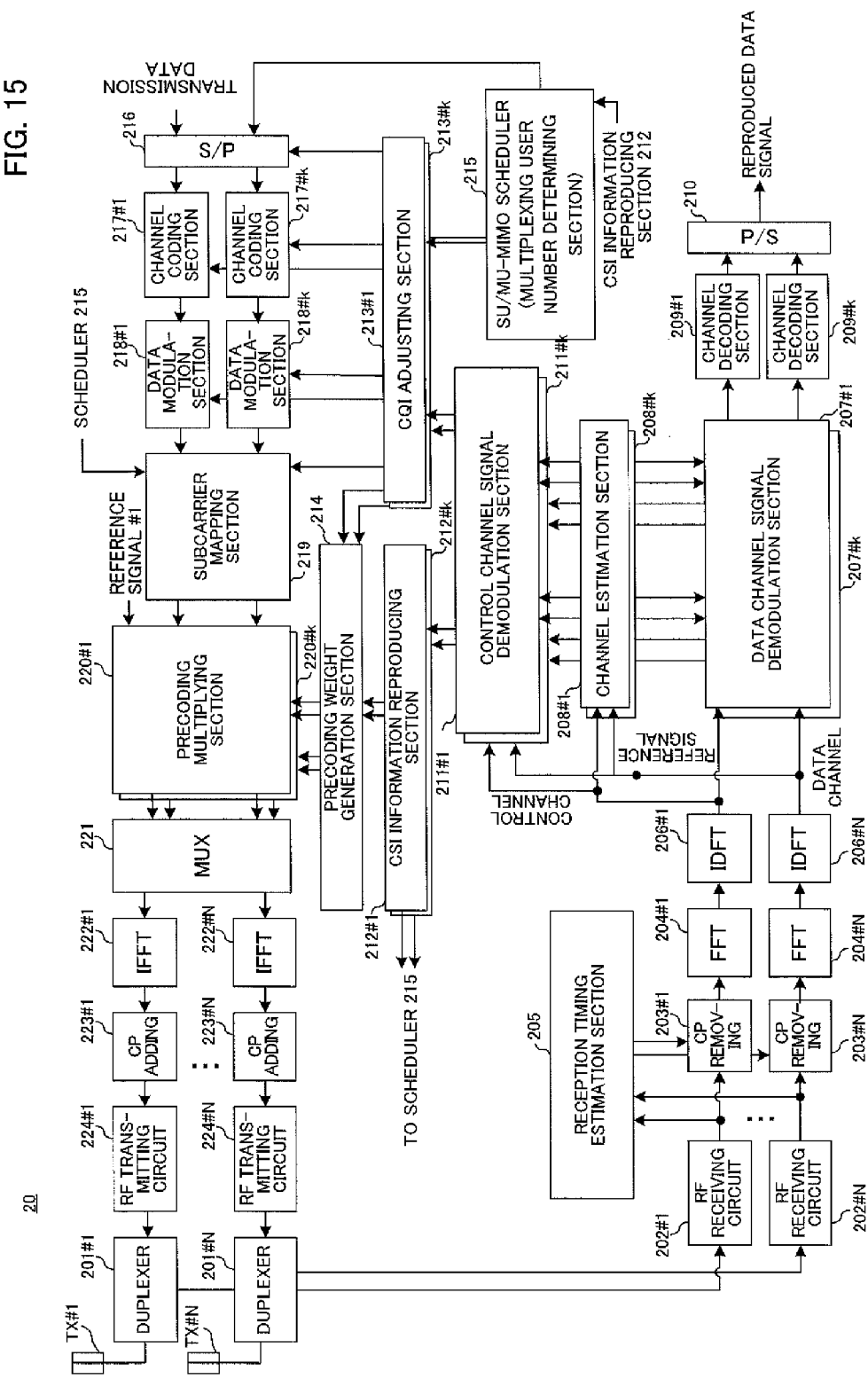
FIG. 15 is a block diagram showing a configuration of a base station apparatus according to the present embodiment.

Next, the configurations of the mobile station apparatus 10 and base station apparatus 20 according to the present embodiment will be described with reference to FIG. 14 and FIG. 15. FIG. 14 is a block diagram showing a configuration of the mobile station apparatus 10 according to the present embodiment. FIG. 15 is a block diagram showing a configuration of the base station apparatus 20 according to the present embodiment. Note that the configurations of the base station apparatus 20 and mobile station apparatus 10 illustrated in FIG. 14 and FIG. 15 have configurations given by simplifying the present invention for ease of explanation, and both have configurations which a general base station apparatus and mobile station apparatus have.

On the other hand, in the mobile station apparatus 10 illustrated in FIG. 14, transmission signals transmitted from the base station apparatus 20 are received by receiving antennas RX #1 to RX #N, electrically separated into the transmitting route and the receiving route by duplexers 101 #1 to 101 #N, and then output to RF receiving circuits 102 #1 to 102 #N. Then, a frequency conversion process for conversion from radio frequency signals into baseband signals is performed in RF receiving circuits 102 #1 to 102 #N. The baseband signals having been subjected to the frequency conversion process have the CPs removed in cyclic prefix (CP) removing sections 103 #1 to 103 #N, and, after that, output to fast Fourier transform sections (FFT sections) 104 #1 to 104 #N.

The reception timing estimation section 105 estimates the reception timing from the reference signal included in the received signal, and reports the estimated result to CP removing sections 103 #1 to 103 #N. FFT sections 104 #1 to 104 #N perform a Fourier transform on the received signal that is received as input, and converts the time sequence signal into a frequency domain signal. After that, the data channel signal included in the received signal is output to the data channel signal demodulation section 106.

The data channel signal demodulation section 106 separates the data channel signals received as input from FFT sections 104 #1 to 104 #N, by, for example, the minimum mean squared error (MMSE) method, the maximum likelihood detection (MLD) signal separation method, and so on.

By this means, the data channel signal having arrived from the base station apparatus 20 is separated into data channel signals related to user #1 to user #k, and the data channel signal related to the user of the mobile station apparatus 10 (referred to as "user k" here) is extracted.

The channel estimation section 107 estimates the amount of channel variation on the channel propagation path from the reference signals included in the received signals output from FFT sections 104 #1 to 104 #N, and reports the estimated amount of channel variation to the data channel signal demodulation section 106 and to a channel quality measurement section 110 and PMI/RI selection/complementary information calculation section, which will be described later. The data channel signal demodulation section 106 separates the data channel signal, based on the reported amount of channel variation, by the MLD signal separation method described above and so on. By this means, the received signal related to user k is demodulated.

Note that, prior to the demodulation process by the data channel signal demodulation section 106, the extracted data channel signal related to user k is demapped in a subcarrier demapping section (not shown) and converted back to a time sequence signal. The data channel signal that is related to user k and demodulated in the data channel signal demodulation section 106 is output to a channel decoding section 108. Then, as a channel decoding process is performed in the channel decoding section 108, the transmission signal for user k (hereinafter referred to as "transmission signal #k") is reproduced.

The channel quality (CQI) measurement section 110 constitutes a measurement section and measures channel quality (CQI) based on the amount of channel variation reported from the channel estimation section 107. Note that the channel quality (CQI) measured in the channel quality (CQI) measurement section 110 is equivalent to the above-described $CQI^{(SU)}$. Then, the channel quality (CQI) measurement section 110 reports the CQI ($CQI^{(SU)}$), which is the measurement result, to the feedback control signal generation section 111 and PMI/RI selection/complementary information calculation section 112.

The PMI/RI selection/complementary information calculation section 112, constituting a selection section, selects a PMI and an RI based on the amount of channel variation reported from the channel estimation section 107. Also, the PMI selection 112, constituting a calculation section, assumes that the Hermitian transpose of the precoding matrix corresponding to the selected PMI as a channel matrix (effective channel $h_{k,eff}^{H}$) and calculates complementary information (such as CQI difference information $\Delta CQI_k$ and quantization error information $\epsilon_k$). Then, the selected PMI is reported to the precoding multiplying section 116, and also the selected PMI and the complementary information are reported to the feedback control signal generation section 111.

For example, with the feedback information transmission method according to the first mode, the PMI/RI selection/complementary information calculation section 112 calculates CQI difference information $\Delta CQI_k$. To be more specific, CQI difference information $\Delta CQI_k$ is calculated based on $CQI^{(SU)}$ measured in the channel quality (CQI) measurement section 110 and $CQI^{(MU)}$ calculated by estimating MAI (see equation 11 to equation 13). Also, with the feedback information transmission method according to the second mode, the PMI/RI selection/complementary information calculation section 112 calculates quantization error information $\epsilon_k$. Furthermore, with the feedback information transmission method according to the third mode, whether or not to calculate complementary information is switched depending on the selected rank (RI). To be more specific, the PMI/RI selection/complementary information calculation section 112 calculates complementary information only at ranks 1 and 2 (that is, only when the correlation between antennas is high) and does not calculate complementary information at rank 3 or above. Note that, when complementary information is not calculated, only the selected PMI and RI are reported to the feedback control signal generation section 111.

Based on the CQI, PMI and RI reported from the channel quality (CQI) measurement section 110 and the complementary information reported from the PMI/RI selection/complementary information calculation section 112, the feedback control signal generation section 111 generates a control signal (for example, the PUCCH) to include feedback information to feed back these, to the base station apparatus 20. The control signal generated in the feedback control signal generation section 111 is output to a multiplexer (MUX) 113.

Meanwhile, transmission data #k that is transmitted from a higher layer and that relates to user #k is subjected to channel coding in the channel coding section 114, subjected to subcarrier modulation in the data modulation section 115, and output to the precoding multiplying section 116. The precoding multiplying section 116 receives as input reference signal #k related to user #k generated in a reference signal generation section (not shown). The precoding multiplying section 116 applies a phase and/or amplitude shift to transmission data #k and the reference signal, for each of receiving antennas RX #1 to RX #N, based on a precoding weight (precoding matrix) acquired from the PMI selected in the PMI selection 112. Transmission data #k and the reference signal having been subjected to the phase and/or amplitude shifting are output to the multiplexer (MUX) 113.

The multiplexer (MUX) 113 combines transmission data #k and reference signal #k having been subjected to phase and/or amplitude shifting, and the control signal generated in the feedback control signal generation section 111, and generates transmission signals for receiving antennas RX #1 to RX #N. The transmission signals generated by the duplexer (MUX) 113 are subjected to the discrete Fourier transform in discrete Fourier transform (DFT) sections 117 #1 to 117 #N, and each transmission signal sequence is spread in the transmission bandwidth (DFT size) in the frequency domain.

Then, an inverse fast Fourier transform is performed in inverse fast Fourier transform (IFFT) sections 118 #1 to #N and the frequency domain signals are converted into time domain signals, and after that, CPs are attached in CP adding sections 119 #1 to 119 #N, and the resulting signals are output to RF transmitting circuits 120 #1 to 120 #N. Then, after a frequency conversion process for conversion into a radio frequency band is performed in RF transmitting circuits 120 #1 to 120 #N, the results are output to receiving antennas RX #1 to RX #N, through duplexers 101 #1 to 101 #N, and transmitted to the base station apparatus 20, on the uplink, from receiving antennas RX #1 to RX #N. Note that these transmission system processing sections constitute a transmission section configured to transmit feedback information to feed back to the base station apparatus 20.

In this way, with the mobile station apparatus 10 according to the present embodiment, complementary information (CQI difference information $\Delta CQI_k$ and quantization error information $\epsilon k$) is added to the CQI, PMI and RI constituting the LTE feedback information, and fed back to the base station apparatus 20, so that the base station apparatus eNode B is able to determine $CQI^{(MU)}$ by adjusting the accuracy of $CQI_k^{(SU)}$ included in the LTE feedback information by means of this complementary information, and select a precoding weight in accordance with that $CQIk^{(MU)}$. By this means, even when the correlation between antennas is low and $CQI_k$ included in the LTE feedback information and the actual channel quality do not match each other, it is still possible to perform precoding for each transmitting antennas by an adequate precoding weight that matches the actual channel quality. Also, since CQI difference information $\Delta CQI_k$ and quantization error information $\epsilon_k$ constituting the complementary information is substantially smaller than $CQI^{(SU)}$, it is possible to prevent the amount of feedback information from increasing significantly compared to the case of adding and feeding back MU-MIMO transmission feedback information. As a result of this, it is possible to reduce the increase of the amount of feedback information and also increase the data rate upon MIMO transmission regardless of whether the correlation between antennas is high or low.

In the base station apparatus 20 illustrated in FIG. 15, transmission signals transmitted from the mobile station apparatus 10 are received by transmitting antennas TX #1 to TX #N, electrically separated into the transmitting route and the receiving route by duplexers 201 #1 to 201 #N, and then output to RF receiving circuits 202 #1 to 202 #N. Then, a frequency conversion process for conversion from radio frequency signals into baseband signals is performed in RF receiving circuits 202 #1 to 202 #N. The baseband signals having been subjected to the frequency conversion process have the CPs removed in cyclic prefix (CP) removing sections 203 #1 to 203 #N, and, after that, output to fast Fourier transform sections (FFT sections) 204 #1 to 204 #N. The reception timing estimation section 205 estimates the reception timing from the reference signal included in the received signal, and reports the estimated result to CP removing sections 203 #1 to 203 #N. FFT sections 204 #1 to 204 #N perform a Fourier transform on the received signal that is received as input, and convert the time sequence signal into a frequency domain signal. The received signal having been converted into a frequency domain signal is subjected to the inverse discrete Fourier transform in inverse discrete Fourier transform (IDFT) sections 206 #1 to 206 #N and dispread into a time domain signal. After that, the data channel signal included in the received signal is output to the data channel signal demodulation section 207. Note that these receiving system processing sections constitute a receiving section configured to receive feedback information that is fed back from the mobile station apparatus 10.

Data channel signal demodulation sections 207 #1 to 207 #k separate the data channel signals received as input from IDFT sections 206 #1 to 206 #N, by, for example, the minimum mean squared error (MMSE) method, the maximum likelihood detection (MLD) signal separation method, and so on. By this means, the data channel signal having arrived from the mobile station apparatus 10 is separated into data channel signals related to user #1 to user #k, and the data channel signals related to each mobile station apparatus 10 are extracted.

Channel estimation sections 208 #1 to 208 #k estimate the amount of channel variation from the reference signals included in the received signals output from IDFT sections 206 #1 to 206 #N, and report the estimated amounts of channel variation to data channel signal demodulation sections 207 #1 to 207 #k and to control channel signal demodulation sections 211 #1 to 211 #k, which will be described later. Data channel signal demodulation sections 207 #1 to 207 #k separate the data channel signal, based on the reported amount of channel variation, by the MLD signal separation method and so on described above. By this means, the received signals related to each mobile station apparatus 10 are demodulated.

Note that, prior to the demodulation process in the data channel signal demodulation section 207, the extracted data channel signals related to each mobile station apparatus 10 are demapped in a subcarrier demapping section (not shown) and returned to time sequence signals. The data channel signals related to each mobile station apparatus 10, demodulated in data channel signal demodulation sections 207 #1 to 207 #k, are output to channel decoding sections 209 #1 to 209 #k. Then, after the channel decoding process is performed in channel decoding sections 209 #1 to 209 #k, parallel-to-serial conversion is performed in the parallel/serial (P/S) conversion section 210, and, by this means, the data channel signal (data signal) from each mobile station apparatus 10 is reproduced.

Control channel signal demodulation sections 211 #1 to 211 #k demodulate the control channel signal (for example, the PDSCH) included in the received signals received as input from IDFT sections 206 #1 to 206 #k. Then, control channel signal demodulation sections 211 #1 to 211 #k demodulate the control channel signals based on the amount of channel variation reported from channel estimation sections 208 #1 to #k. The control channel signals include feedback information from the mobile station apparatus 10. The control channel signals demodulated by control channel signal demodulation sections 211 #1 to 211 #k are output to CSI information reproducing sections 212 #1 to 212 #k and CQI adjusting sections 213 #1 to 213 #k.

CSI information reproducing sections 212 #1 to 212 #k determine a channel matrix (effective channel $h_{k,eff}^H$) from the precoding matrix corresponding to the PMI included in the feedback information from the mobile station apparatus 10. To be more specific, the Hermitian transpose of the precoding matrix corresponding to the PMI included in the feedback information is determined, and this is used as a channel matrix (effective channel $h_{k,eff}^H$). The channel matrices (effective channels $h_{k,eff}^H$) determined in CSI information reproducing sections 212 #1 to 212 #k are output to the precoding weight generation section 214 and SU/MU-MIMO scheduler (hereinafter simply referred to as "scheduler") 215.

CQI adjusting sections 213 #1 to 213 #k, constituting a calculation section, calculate $CQI^{(MU)}$ based on the CQI (which corresponds to the $CQI^{(SU)}$ described above) included in feedback information from the mobile station apparatus 10 and complementary information (CQI difference information $\Delta CQI_k$ and quantization error information $\epsilon_k$). For example, with the feedback information transmission method according to the first mode, $CQI^{(MU)}$ is calculated based on $CQI^{(SU)}$ and CQI difference information $\Delta CQI_k$. Also, with the feedback information transmission method according to the second mode, $CQI^{(MU)}$ is calculated based on $CQI^{(SU)}$ and quantization error information $\epsilon_k$. Furthermore, with the feedback information transmission method according to the third mode, $CQI^{(MU)}$ is calculated based on $CQI^{(SU)}$ and complementary information (CQI difference information $\Delta CQI_k$ and quantization error information $\epsilon_k$) only at ranks 1 and 2. Note that the $CQI^{(MU)}$ calculation process in the CQI adjusting sections 213 #1 to 213 #k is carried out only when MU-MIMO transmission is commanded from the scheduler 215 (which will be described later). Consequently, a case where SU-MIMO transmission is commanded by the scheduler 215, $CQI^{(MU)}$ calculation process does not perform.

The $CQI^{(MU)}$ ($CQI^{(SU)}$ upon SU-MIMO transmission) calculated in CQI adjusting sections 213 #1 to 213 #k is output to the precoding weight generation section 214 with the PMI and RI included in the feedback information. Also, these pieces of information are output to a rank/MCS selection section (not shown). The rank/MCS selection section selects the transmission rank and MCS based on the PMI included in the feedback information. The selected transmission rank and MCS are output to a serial/parallel conversion section (S/P) 216, channel coding sections 217 #1 to 217 #k, data modulation section 218 #1 to 218 #k and a subcarrier mapping section 219, which will be described later.

The precoding weight generation section 214 constitutes a weight generating section and selects the precoding weight (precoding matrix) for each of transmitting antenna TX #1 to TX #N, based on the channel matrices (effective channels $h_{k,eff}^H$) reported from CSI information reproducing sections 212 #1 to 212 #k, and $CQI^{(MU)}$ ($CQI^{(SU)}$, PMI and RI reported from CQI adjusting sections 213 #1 to 213 #k. The precoding weight generation section 214 selects a precoding weight (precoding matrix) based on $CQI^{(MU)}$, not $CQI^{(SU)}$, according to need, so that it is possible to select a precoding weight to match the actual channel quality when the accuracy of $CQI^{(SU)}$ is deteriorated. Precoding weights that are selected are output to precoding multiplying sections 220 #1 to 220 #k (described later).

The scheduler 215 determines the number of users to multiplex (the number of mobile station apparatuses 10) based on the channel matrices (effective channels $h_{k,eff}^H$) reported from CSI information reproducing sections 212 #1 to 212 #k. Then, the determined number of users to multiplex is output to the serial/parallel conversion section (S/P) 216. Also, the scheduler 215 reports the type of MIMO transmission (SU-MIMO transmission or MU-MIMO transmission), which is specified according to the determined number of users to multiplex, to CSI information reproducing sections 212 #1 to 212 #k.

Transmission data #1 to #k for users #1 to #k are output to the serial/parallel conversion section (S/P) 216, subjected to serial-to-parallel conversion, and, after that, output to channel coding sections 217 #1 to 217 #k corresponding to users #1 to #k. The serial-to-parallel conversion in this serial/parallel conversion section (S/P) 216 is carried out based on the number of users to multiplex reported from the scheduler 215. Also, in the serial-to-parallel conversion process in the serial/parallel conversion section (S/P) 216, the rank/MCS reported from the rank/MCS selection section is referenced.

Transmission data #1 to #k having been subjected to the serial-to-parallel conversion are subjected to channel coding in channel coding sections 217 #1 to 217 #k, and, after that, output to data modulation sections 218 #1 to 218 #k and subjected to data modulation. The channel coding and data modulation then are performed based on the MCS given from the rank/MCS selection section.

Transmission data #1 to #k having been subjected to data modulation in data modulation sections 218 #1 to 218 #k are subjected to an inverse Fourier transform in a discrete Fourier transform section (not shown) and converted from a time sequence signal into a frequency domain signal, and output to the subcarrier mapping section 219.

In the subcarrier mapping section 219, transmission data #1 to #k are mapped to subcarriers in accordance with the scheduling information provided from the scheduler 215. Here, the subcarrier mapping section 219 maps (multiplexes) reference signals #1 to #k received as input from a reference signal generation section (not shown), to subcarriers, with transmission data #1 to #k. In this way, transmission data #1 to #k mapped to the subcarriers are output to precoding multiplying sections 220 #1 to 220 #k.

Based on the precoding weights given from the precoding weight generation section 214, precoding multiplying sections 220 #1 to 220 #k apply phase and/or amplitude shifts to transmission data #1 to #k for each of transmitting antenna TX #1 to TX #N (weighting of transmitting antenna TX #1 to transmitting antenna TX #N by precoding). Then, transmission data #1 to #k having been subjected to phase and/or amplitude shift in the precoding multiplying section 220 are output to a multiplexer (MUX) 221.

In the multiplexer (MUX) 221, transmission data #1 to #k having been subjected to phase and/or amplitude shifting are combined, and a transmission signal for each of transmitting antennas TX #1 to TX #N is generated. The transmission signals generated in the multiplexer (MUX) 221 are subjected to an inverse fast Fourier transform in inverse fast Fourier transform (IFFT) sections 222 #1 to 222 #N and converted from frequency domain signals into time domain signals. Then, the time domain signals are added CPs in cyclic prefix (CP) adding sections 223 #1 to 223 #N, and, after that, output to RF transmitting circuit 224 #1 to 224 #N. Then, after frequency conversion process to convert into a radio frequency band is performed in RF transmitting circuits 224 #1 to 224 #N, the signals are output to transmitting antennas TX #1 to TX #N via duplexers 201 #1 to 201 #N and transmitted to the mobile station apparatus 10 from the transmitting antenna TX #1 to TX #N on the downlink.

In this way, the base station apparatus 20 according to the present invention calculates $CQI^{(MU)}$ based on $CQI^{(SU)}$ and complementary information (CQI difference information $\Delta CQI_k$ and quantization error information $\epsilon_k$) included in feedback information from the mobile station apparatus 10 upon MU-MIMO transmission, and selects a precoding in accordance with this $CQI_k^{(MU)}$. By this means, even when the correlation between antennas is low and $CQI_k$ included in the LTE feedback information and the actual channel quality do not match each other, it is still possible to perform precoding for each transmitting antenna by an adequate precoding weight that matches the actual channel quality. Also, since CQI difference information $\Delta CQI_k$ and quantization error information $\epsilon_k$ constituting the complementary information are substantially smaller than $CQI^{(SU)}$, it is possible to prevent the amount of feedback information from increasing significantly compared to the case of adding and feeding back MU-MIMO transmission feedback information. As a result of this, it is possible to reduce the increase of the amount of feedback information and also increase the data rate upon MIMO transmission regardless of whether the correlation between antennas is high or low.

As described above, with the feedback information transmission method according to the present invention, complementary information (CQI difference information $\Delta CQI_k$ and quantization error information $\epsilon_k$) that complements the difference between $CQI^{(SU)}$ and $CQI^{(MU)}$ included in LTE feedback information is added to LTE feedback information ($RI_k$, $PMI_k$ and $CQI_k^{(SU)}$) and fed back from the mobile station apparatus 10. In the base station apparatus eNode B, by adjusting the accuracy of $CQI_k^{(SU)}$ included in the LTE feedback information by this CQI difference information $\Delta CQI_k$, it is possible to determine $CQI^{(MU)}$ and select a precoding weight according to this $CQI_k^{(MU)}$. By this means, even when the correlation between antennas is low and $CQI_k$ ($CQI_k^{(SU)}$) included in the LTE feedback information and the actual channel quality do not match each other, it is still possible to perform precoding for each transmitting antenna by an adequate precoding weight that matches the actual channel quality. Also, since the complementary information is substantially smaller than $CQI^{(SU)}$, it is possible to prevent the amount of feedback information from increasing significantly compared to the case of adding and feeding back MU-MIMO transmission feedback information. As a result of this, it is possible to reduce the increase of the amount of feedback information and also increase the data rate upon MIMO transmission regardless of whether the correlation between antennas is high or low.

Now, although the present invention has been described in detail with reference to the above embodiment, it should be obvious to a person skilled in the art that the present invention is by no means limited to the embodiment described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

For example, although a case has been described with above embodiment where, when the mobile station apparatus UE makes the number of layers (rank) "2" by $RI_k$ and feeds back two of $CQI1_k^{(SU)}$ and $CQI2_k^{(SU)}$, CQI difference information $\Delta CQI1_k$ and $\Delta CQI2_k$ corresponding to $CQI1_k^{(SU)}$ and $CQI2_k^{(SU)}$ or CQI difference information $\Delta CQI1_k$ or $\Delta CQI2_k$ for the one of the greater value between $CQI1_k^{(SU)}$ and $CQI2_k^{(SU)}$, is added to the LTE feedback information, the information to be added to the LTE feedback information is by no means limited to these. For example, it is equally possible to add a mean value, a square mean value and so on of $CQI1_k^{(SU)}$ and $CQI2_k^{(SU)}$ to the LTE feedback information. When these values are added to the LTE feedback information, it is possible to achieve the same advantage as when adding CQI difference information $\Delta CQI1_k$ and $\Delta CQI2_k$.

The disclosure of Japanese Patent Application No. 2010-100036, filed on Apr. 23, 2010, including the specification, drawings, and abstract, is incorporated herein by reference in its entirety.

The invention claimed is:

1. A feedback information transmission method to assume a Hermitian transpose of a precoding matrix corresponding to a PMI that is selected in accordance with an amount of channel variation as a channel matrix and transmit feedback information to use in MIMO transmission to a base station apparatus, the feedback information transmission method comprising the steps of:
   selecting the PMI and an RI in accordance with the amount of channel variation;
   measuring a CQI for single-user MIMO transmission in accordance with the amount of channel variation;
   calculating complementary information that complements a difference between the CQI for single-user MIMO transmission and a CQI for multi-user MIMO transmission; and
   transmitting the PMI, RI, CQI for single-user MIMO transmission and complementary information to the base station apparatus as the feedback information,
   wherein
   difference information between the CQI for single-user MIMO transmission, and a CQI for multi-user MIMO transmission that is calculated by estimating multiple access interference, is calculated as the complementary information, and
   difference information corresponding to a CQI for single-user MIMO transmission having a greater value in a plurality of CQIs for single-user MIMO transmission to match the rank to feed back in the RI, is calculated and included in the feedback information.

2. The feedback information transmission method according to claim 1, wherein the number of bits of the difference information is made smaller than the number of bits of the CQI for single-user MIMO transmission.

3. The feedback information transmission method according to claim 1, wherein the number of bits of the difference information is one bit.

4. The feedback information transmission method according to claim 1, wherein the number of bits given by adding the number of bits of the difference information to the number of bits of part of the feedback information when the rank to feed back in the RI is one or two, and the number of bits of part of the feedback information when the rank to feed back in the RI is three or greater, are made the same value.

5. A feedback information transmission method to assume a Hermitian transpose of a precoding matrix corresponding to a PMI that is selected in accordance with an amount of channel variation as a channel matrix and transmit feedback information to use in MIMO transmission to a base station apparatus, the feedback information transmission method comprising the steps of:
    selecting the PMI and an RI in accordance with the amount of channel variation;
    measuring a CQI for single-user MIMO transmission in accordance with the amount of channel variation;
    calculating complementary information that complements a difference between the CQI for single-user MIMO transmission and a CQI for multi-user MIMO transmission; and
    transmitting the PMI, RI, CQI for single-user MIMO transmission and complementary information to the base station apparatus as the feedback information,
    wherein quantization error information, which is produced due to assuming the Hermitian transpose of the precoding matrix corresponding to the PMI as the channel matrix, is calculated as the complementary information, and
    wherein quantization error information corresponding to a CQI for single-user MIMO transmission having a greater value in a plurality of CQIs for single-user MIMO transmission to match the number of layers to feed back in the RI, is calculated and included in the feedback information.

6. The feedback information transmission method according to claim 5, wherein angle information between a first vector corresponding to the precoding matrix corresponding to the PMI and a second vector corresponding to the channel matrix that is the Hermitian transpose of the precoding matrix, is calculated as the quantization error information.

7. The feedback information transmission method according to claim 5, wherein a chordal distance between the precoding matrix corresponding to the PMI and the channel matrix that is the Hermitian transpose of the precoding matrix, is calculated as the quantization error information.

8. The feedback information transmission method according to claim 5, wherein the number of bits of the quantization error information is made smaller than the number of bits of the CQI for single-user MIMO transmission.

9. The feedback information transmission method according to claim 5, wherein the number of bits of the quantization error information is one bit.

10. The feedback information transmission method according to claim 5, wherein the number of bits given by adding the number of bits of the quantization error information to the number of bits of part of the feedback information when the rank to feed back in the RI is one or two, and the number of bits of part of the feedback information when the rank to feed back in the RI is three or greater, are made the same value.

11. A mobile station apparatus to assume a Hermitian transpose of a precoding matrix corresponding to a PMI that is selected in accordance with an amount of channel variation as a channel matrix and transmit feedback information to use in MIMO transmission to a base station apparatus, the mobile station apparatus comprising:
    a selection section configured to select the PMI and an RI in accordance with the amount of channel variation;
    a measurement section configured to measure a CQI for single-user MIMO transmission in accordance with the amount of channel variation;
    a calculation section configured to calculate complementary information that complements a difference between the CQI for single-user MIMO transmission and a CQI for multi-user MIMO transmission; and
    a transmission section configured to transmit the PMI, RI, CQI for single-user MIMO transmission and complementary information to the base station apparatus as the feedback information,
    wherein
    difference information between the CQI for single-user MIMO transmission, and a CQI for multi-user MIMO transmission that is calculated by estimating multiple access interference, is calculated as the complementary information, and
    difference information corresponding to a CQI for single-user MIMO transmission having a greater value in a plurality of CQIs for single-user MIMO transmission to match the rank to feed back in the RI, is calculated and included in the feedback information.

12. A base station apparatus to assume a Hermitian transpose of a precoding matrix corresponding to a PMI that is selected in accordance with an amount of channel variation as a channel matrix and receive feedback information to use in MIMO transmission from a mobile station apparatus, the base station apparatus comprising:
    a receiving section configured to receive the feedback information from the mobile station apparatus;
    a calculation section configured to calculate a CQI for multi-user MIMO transmission from a CQI for single-user MIMO transmission included in the feedback information and complementary information that complements a difference between the CQI for single-user MIMO transmission and the CQI for multi-user MIMO transmission; and
    a weight generation section configured to generate a precoding weight based on the CQI for multi-user MIMO transmission,
    wherein
    difference information between the CQI for single-user MIMO transmission, and a CQI for multi-user MTMO transmission that is calculated by estimating multiple access interference, is calculated as the complementary information, and
    difference information corresponding to a CQI for single-user MIMO transmission having a greater value in a plurality of CQIs for single-user MIMO transmission to match the rank to feed back in the RI, is calculated and included in the feedback information.

* * * * *